US011722985B2

(12) United States Patent
McQueen et al.

(10) Patent No.: US 11,722,985 B2
(45) Date of Patent: Aug. 8, 2023

(54) OBJECT TRACKING AND AUTHENTICATION USING MODULAR WALL UNITS

(71) Applicant: Apple Inc., Cupertino, CA (US)

(72) Inventors: Travis J. McQueen, San Jose, CA (US); Clark Della Silva, San Francisco, CA (US); Scott G. Johnston, Los Gatos, CA (US); Wade R. Barnett, San Jose, CA (US); Christopher Merrill, San Francisco, CA (US); Jay C. Couch, San Martin, CA (US)

(73) Assignee: APPLE INC., Cupertino, CA (US)

( * ) Notice: Subject to any disclaimer, the term of this patent is extended or adjusted under 35 U.S.C. 154(b) by 976 days.

(21) Appl. No.: 16/362,432

(22) Filed: Mar. 22, 2019

(65) Prior Publication Data

US 2020/0053689 A1 Feb. 13, 2020

Related U.S. Application Data

(60) Provisional application No. 62/716,635, filed on Aug. 9, 2018.

(51) Int. Cl.
*H04W 64/00* (2009.01)
*H04W 12/06* (2021.01)
(Continued)

(52) U.S. Cl.
CPC ......... *H04W 64/003* (2013.01); *G01S 5/0247* (2013.01); *G01S 5/0289* (2013.01);
(Continued)

(58) Field of Classification Search
CPC ....... H04W 4/023; H04W 12/06; H04W 4/33; H04W 64/003; H04W 12/63; G01S 5/02;
(Continued)

(56) References Cited

U.S. PATENT DOCUMENTS 9,521,009 B1 12/2016 Skeffington
10,460,596 B2 * 10/2019 Ramirez ................. G01S 13/56
(Continued)

OTHER PUBLICATIONS

U.S. Appl. No. 16/358,497, Non-Final Office Action, dated Jun. 25, 2020, 17 pages.
(Continued)

*Primary Examiner* — Khawar Iqbal
(74) *Attorney, Agent, or Firm* — Kilpatrick Townsend & Stockton LLP

(57) ABSTRACT

A system may include one or more processors and a host unit installed in a support structure of a building, the host unit including a communication module configured to send or receive communication data with at least one or more additional host units installed in the building, where the one or more processors are configured to measure an attribute of the sent or received communication data and detect a presence of an object based on a threshold change in the measured attribute of the sent or received communication data between the host unit and the one or more additional host units. The attribute can be an angle-of-signal (AoS) arrival of the communication between the host unit and each of the one or more additional host units, where the threshold change in the measured attribute is a threshold change in the measured AoS arrival.

19 Claims, 19 Drawing Sheets

(51) Int. Cl.
*H04W 4/02* (2018.01)
*G01S 5/02* (2010.01)
*H01R 13/66* (2006.01)
*H04W 4/33* (2018.01)
*H04W 12/63* (2021.01)

(52) U.S. Cl.
CPC ........ *H01R 13/6691* (2013.01); *H04W 4/023* (2013.01); *H04W 4/33* (2018.02); *H04W 12/06* (2013.01); *H04W 12/63* (2021.01)

(58) Field of Classification Search
CPC .... G01S 5/0205; G01S 5/0289; G01S 5/0247; G01S 2205/01; G06F 21/34; G06F 21/32; G06F 21/44; G06F 21/35; G06F 21/31; G06F 2221/2129; H04L 63/107; H04L 63/0861; H04L 67/12; H01R 13/6691
See application file for complete search history.

(56) References Cited

U.S. PATENT DOCUMENTS

| | | | |
|---|---|---|---|
| 10,476,730 B2* | 11/2019 | Xu | H04B 1/38 |
| 10,681,792 B2* | 6/2020 | Hu | H04L 41/0893 |
| 11,147,146 B2* | 10/2021 | Cho | H04B 7/155 |
| 2007/0121096 A1 | 5/2007 | Giger et al. | |
| 2009/0219145 A1 | 9/2009 | Wong et al. | |
| 2010/0277182 A1 | 11/2010 | Fredericksen et al. | |
| 2011/0031897 A1 | 2/2011 | Henig et al. | |
| 2015/0382436 A1* | 12/2015 | Kelly | H05B 47/19 315/131 |
| 2016/0261268 A1 | 9/2016 | Rakova et al. | |
| 2016/0312986 A1 | 10/2016 | Maros et al. | |
| 2016/0323754 A1 | 11/2016 | Friday et al. | |
| 2017/0117108 A1 | 4/2017 | Richardson et al. | |
| 2017/0343658 A1* | 11/2017 | Ramirez | G08B 13/2491 |
| 2017/0358142 A1 | 12/2017 | Lee et al. | |
| 2018/0270933 A1* | 9/2018 | Hu | H05B 47/155 |
| 2018/0329617 A1 | 11/2018 | Jones et al. | |
| 2019/0098507 A1* | 3/2019 | Yang | H04L 63/1483 |
| 2019/0219665 A1* | 7/2019 | Ye | G01S 5/021 |
| 2019/0268710 A1* | 8/2019 | Shi | G06F 3/165 |
| 2020/0106637 A1 | 4/2020 | Jakobsson | |
| 2020/0301378 A1* | 9/2020 | McQueen | G05B 15/02 |
| 2020/0371222 A1* | 11/2020 | Kravets | G01S 13/04 |
| 2021/0233389 A1* | 7/2021 | Kim | H04L 12/2803 |
| 2022/0104019 A1* | 3/2022 | Yang | H04W 12/12 |

OTHER PUBLICATIONS

Ackerman, Evan, "Neato Adds Persistent, Actionable Maps to New D7 Robot Vacuum", Retrieved at https://spectrum.ieee.org/automaton/robotics/home-robots/neato-adds-persistent-actionable-maps-to-new-d7-robot-vacuum, IEEE Spectrum, Aug. 31, 2017, 4 pages.

Ackerman, Evan, "iRobot Testing Software to Make Sense of All Rooms in a House", Retrieved at https://spectrum.ieee.org/automaton/robotics/home-robots/how-irobots-roomba-will-roomify-your-home, IEEE Spectrum, Nov. 20, 2017, 3 pages.

U.S. Appl. No. 16/358,497, Notice of Allowance, dated Nov. 16, 2020, 14 pages.

Mura et al., "Automatic Room Detection and Reconstruction in Cluttered Indoor Environments with Complex Room Layouts", Computers & Graphics, vol. 44, 2014, pp. 20-32.

Ochmann et al., "Automatic Reconstruction of Parametric Building Models from Indoor Point Clouds", Computer & Graphics, vol. 54, 2016, pp. 94-103.

Okorn et al., "Toward Automated Modeling of Floor Plans", Proceedings of the Symposium on 3D Data Processing. Visualization and Transmission, May 17, 2010, 8 pages.

International Patent Application No. PCT/US2019/023225, "International Search Report and Written Opinion", dated Jun. 11, 2019, 13 pages.

Turner et al., "Floor Plan Generation and Room Labeling of Indoor Environments from Laser Range Data", International Conference on Computer Graphics Theory and Applications (Grapp), Scitepress, 2014, pp. 1-12.

U.S. Appl. No. 16/362,501, Non-Final Office Action, dated Aug. 19, 2022, 30 pages.

* cited by examiner

OBJECT TRACKING AND AUTHENTICATION USING MODULAR WALL UNITS

CROSS REFERENCES TO RELATED APPLICATIONS

This application claims priority to U.S. Provisional Patent Application No. 62/716,635, filed on Aug. 9, 2018, the disclosure of which is herein incorporated by reference in its entirety and for all purposes.

TECHNICAL FIELD

The present disclosure relates generally to electrical systems and in particular to a modular and configurable utility system for a building.

BACKGROUND

Smart home technology has greatly improved in power and functionality in recent years and can provide an enhanced user experience that can be tailored to meet an individual user's particular needs. For instance, smart lights, smart security systems, smart entertainment systems, environmental control systems (HVAC), and the like, are becoming more and more customizable and integrated as the internet-of-things (IoT) sets a foothold in modern home designs.

Configuring the smart home can present many challenges. For instance, the differentiation of brands and their incompatibilities between each other, differing connection and communication protocols, wiring and connector types, hardware/software configurations, and general system set up can be daunting to the average consumer. Even technology savvy enthusiasts may be challenged by the non-intuitive and often frustratingly laborious process of configuring a fully integrated smart home. Furthermore, smart home networks often need to be reconfigured, sometimes extensively, as old equipment is replaced with new equipment. Despite the many advantages that smart home technology brings to society, there is a need for smart home systems that can allow lay-consumers to more easily customize, scale, and reconfigure their homes in a more effortless and user friendly manner.

SUMMARY

In certain embodiments, a system can include one or more processors and a host unit installed in a support structure of a building, the host unit including: a communication module, controlled by the one or more processors and configured to send or receive communication data with at least one or more additional host units installed in the building. The one or more processors can be configured to measure an attribute of the sent or received communication data and detect a presence of an object based on a threshold change in the measured attribute of the sent or received communication data between the host unit and the one or more additional host units. The attribute may be a time-of-flight (TOF) of the sent or received communication data, where the one or more processors are further configured to measure a distance between the host unit and each of the one or more additional host units based on the TOF of the sent or received communication data, and where the threshold change in the measured attribute is a threshold change in the measured distance. Alternatively or additionally, the attribute can be an angle of signal arrival of the communication between the host unit and each of the one or more additional host units, wherein the threshold change in the measured attribute is a threshold change in the measured angle of signal arrival.

In some embodiments, the one or more processors may be further configured to determine a type of the detected object based on an amount of distortion or frequency content of the distortion in the communication data. The type of the detected object can be determined to be an inanimate object when the amount of distortion is below a threshold value, and the type of the detected object can be determined to be an animate object when the amount of distortion is at or above the threshold value. In some aspects, the one or more processors can be configured to: receive data identifying the detected object including physical dimension data and determine a vector for the detected object based on a duration that the threshold change in the measured angle-of-signal arrival is detected and the physical dimension data of the detected object. The one or more processors can also be configured to determine a vector for the detected object based on a chronological order of the changes in the measured angles-of-signal arrival between the host unit and at least two of the additional host units.

In certain embodiments, the system can further include a millimeter wave sensor (MWS) system (e.g., 60 GHz) controlled by the one or more processors, where the one or more processors can be further configured to scan for a heart rate of the detected object using the MWS system in response to the presence of the object being detected, and where the one or more processors are configured to distinguish between two or more detected objects based on one or more characteristics of the scanned heart rates. In some implementations, the one or more processors can be configured to receive identification data that identifies the detected object, where the identification data includes user authentication data, and where the one or more processors are configured to assign a confidence level to the identified object based on the authentication data, the confidence level corresponding to a level of confidence that the identified object is an accurately identified occupant.

In further embodiments, a method may include establishing a wireless electronic communication between a host unit and one or more additional host units in a building; measuring an attribute of the wireless electronic communication; and detecting the presence of an object in the room based on a change of the measured attribute of the electronic communication. In some cases, the method can further include determining a distance from the host unit to the one or more additional host units based on a time-of-flight of the wireless electronic communication between the host unit and the one or more additional host units, where the detecting the presence of an object in the building is based on a threshold change of the determined distance. The method may further include determining a type of the detected object based on an amount of distortion in the determined distance between the host unit and the one or more additional units, where the type of the detected object is determined to be an inanimate object when the amount of distortion is below a threshold value, and where the type of the detected object is determined to be an animate object when the amount of distortion is at or above the threshold value. In some cases, the method can further include determining an angle-of-signal arrival of the wireless electronic communication, where the detecting the presence of an object in the building is based on a threshold change of the determined angle-of-signal arrival.

In some embodiments, the method may further include determining a type of the detected object based on an amount of distortion in the determined angle-of-signal arrival, where the type of the detected object is determined to be an inanimate object when the amount of distortion is below a threshold value, and where the type of the detected object is determined to be an animate object when the amount of distortion is at or above the threshold value. The method can further include determining a vector for the detected object based on a chronological order of the changes in the measured attribute of the electronic communication between the host unit and at least two of the additional host units.

In further embodiments, a system may include one or more non-transitory, computer readable storage mediums containing instructions configured to cause the one or more processors to perform operations including: establishing a wireless electronic communication between a host unit and one or more additional host units in a building; determining a distance from the host unit to the one or more additional host units based on a time-of-flight of the wireless electronic communication between the host unit and the one or more additional host units; and detecting the presence of an object in the room based on a change of the determined distance between the host unit and the one or more additional host units. The instructions can be further configured to cause the one or more processors to perform operations including: determining a type of the detected object based on an amount of distortion in the determined distance between the host unit and the one or more additional units. The type of the detected object can be determined to be an inanimate object when the amount of distortion is below a threshold value, and the type of the detected object can be determined to be an animate object when the amount of distortion is at or above the threshold value.

In some embodiments, the instructions may be further configured to cause the one or more processors to perform operations including: determining a vector for the detected object based on a chronological order of the changes in the determined distances between the host unit and at least two of the additional host units. In some implementations, the instructions can be further configured to cause the one or more processors to perform operations including: receiving identification data that identifies the detected object, wherein the identification data includes user authentication data and assigning a confidence level to the identified object based on the authentication data, the confidence level corresponding to a level of confidence that the identified object is an accurately identified occupant. The authentication data may include at least one of a cryptographic key, a password, or biometric data, where the biometric data includes at least one of heart rate data, finger print data, iris scan data, object movement data, or object size data, and where the object movement data includes at least one of object speed data or object gate data.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION

Aspects, features and advantages of embodiments of the present disclosure will become apparent from the following description of embodiments in reference to the appended drawings.

DETAILED DESCRIPTION

Figure 1:
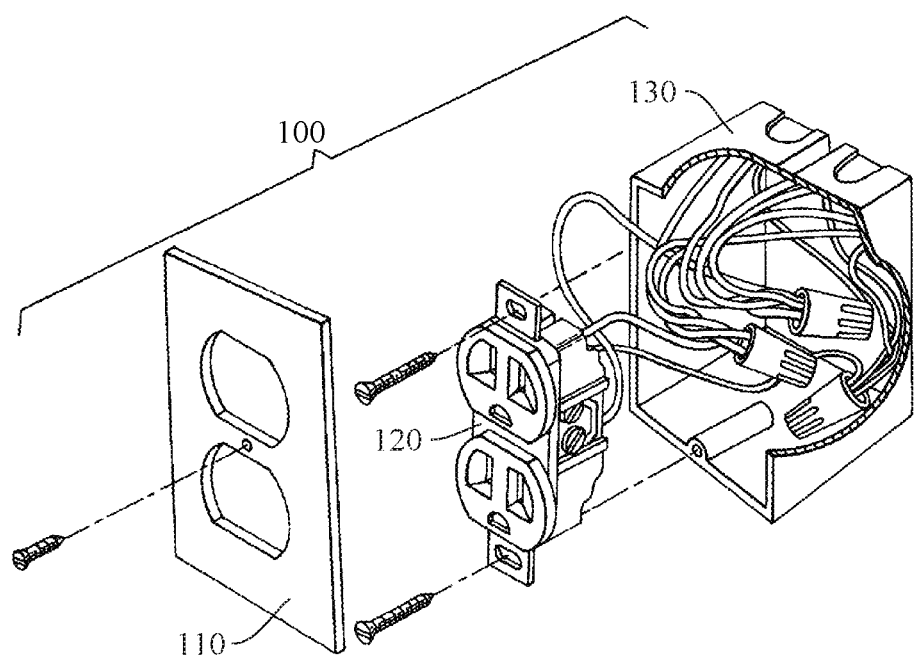
FIG. 1 shows a simplified diagram of a conventional power outlet in a residential, commercial, or industrial environment.

Aspects of the present disclosure relate generally to electrical systems and in particular to a modular and configurable utility infrastructure for a building.

In the following description, various embodiments of a system for configuring a smart home system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Simplified Overview

As a general non-limiting overview, certain embodiments of the present invention can relate to a modular and configurable system for a building (e.g., residential, commercial, or industrial site) that can automatically and dynamically configure a smart building (e.g., smart home) environment as modular accessories are added and removed from the system. One of the core elements of the system include a host unit and modular accessory. The host unit (e.g., see 200 in FIG. 2A) can be embedded within (or coupled to) a structure of a building such as a wall, floor, or ceiling, and integrated with the electrical infrastructure of the home (e.g., electrical power grid, cable/Ethernet network, etc.). The modular accessory (e.g., see FIGS. 5A-5D) such as a power outlet, light switch, sensor device, etc., can be configured to be interchangeably and non-destructively coupled and decoupled with the host unit. Once coupled, the system can automatically authenticate and configure (sometimes referred to as bootstrapping) the modular accessory by, for example, coupling AC power and/or Ethernet access to the accessory, and configuring the setup and operation of the modular accessory in the smart home environment, which can include setting modular accessory control schemes (e.g., functionality and user control hierarchy) and the like, as further discussed below.

Continuing the general overview, a network of host units can be configured to communicate with one another using any suitable communication protocol (e.g., ultra-wide band (UWB), radar, ultrasound, RF, etc.) to determine a distance and location of each host unit relative to one another. Some embodiments include hardware elements (e.g., magnetometer, accelerometer, multiple antennas, etc.) to also determine an orientation of each host unit in three-dimensional space. The system can then determine and auto-generate a floor plan for the building based on the determined locations, orientations, and distances without any necessary user input or interaction. This is further discussed below with respect to FIGS. 7-9C. The system may process the distance and/or orientation data at a particular host unit, a central processing device operating as a "brain" (e.g., mobile computing device, desktop computer, etc.), an offsite cloud computing environment, or the like, or any combination thereof, as discussed in further detail below. With the determined floorplan, the system can make intuitive decisions for default auto-configuration of modular accessories.

For instance, in response to a control switch (e.g., light switch in a modular accessory) being installed in a particular host unit, the system may auto-configure the control switch to control the operation of a particular lighting element in a particular room after determining that the control switch is in the particular room and no other lighting elements or control switches are located in said room. This is but one simple example of the myriad possibilities achievable using aspects of the present invention, and the examples that follow are intended to provide a more thorough understanding of the inventive concepts described herein and should not be interpreted in any way to be limiting in terms of the breadth of application of the present invention. One of ordinary skill in the art with the benefit of this disclosure would understand the many variations, modifications, and alternative embodiments thereof. Thus, aspects of the present invention provide a smart home environment that can allow users to more easily customize, scale, and reconfigure their homes in a more effortless and user friendly manner.

Some particular embodiments may include a modular host system with a host unit installed in a support structure (e.g., wall, ceiling, floor, etc.) of a building that can receive and house a modular accessory. The modular accessory can be, e.g., a control switch (e.g., bistable switch, thermostat, etc.), power outlet, sensor module (e.g., image sensor, audio sensor, force sensor, etc.), or the like. The host unit may include a power gating module that can couple and decouple electrical power (e.g., AC or DC power) from an electrical source (e.g., utility grid, renewable energy resource, etc.) to the modular accessory, and a communication module that can communicate via hardwired (e.g., Ethernet, fiber optics, coaxial cable) or wireless communication (e.g., via ultra-wide band (UWB), radar, RF, etc.) with one or more additional host units installed in the building. In some embodiments, the communication module may perform a gating function to couple and decouple a physical network connection from a network source (e.g., Ethernet, fiber optics, coaxial) to the host unit. Distance data corresponding to a distance between the host unit and each of the one or more additional host units can be gleaned from said wired or wireless communication. In some implementations, the system can then automatically determine a floor plan of the building based at least on the determined distances from the host unit to the one or more additional host units. In some cases, each host unit can include a self-orientation module that can determine an orientation of the host unit in three-dimensional (3D) space and, in some cases, an orientation relative to the support structure it is installed in. The floor plan can further be based on orientation data from the orientation module. The orientation module can include an inertial motion unit (IMU), accelerometer, magnetometer, barometer, altimeter, one or more antennas, or the like, as further described below. Alternatively or additionally, some host units may be configured to track the relative position and orientation of a portable device (e.g., tablet computer, smart phone or wearable, laptop computer, etc.) that has a compatible communication module. Certain embodiments may employ an authentication module for additional security, as further described below with respect to FIG. 6. The modular host system can be of any suitable form factor; however, particular embodiments may be operable to be retrofitted into a space configured to receive a conventional standard wall outlet, as described below with respect to FIG. 1. To provide some non-limiting implementations, the host unit can be configured to fit into a new/different space in a support structure (e.g., wall), the host unit can be a 1:1 physical substitute for the an outlet box (see, e.g., FIG. 1, element 130) as noted above, or the host unit can fit completely inside an existing outlet box, such that no complete removal of existing infrastructure may be needed, among other possible implementations. One of ordinary skill in the art with the benefit of this disclosure would understand the many variations, modifications, and alternative embodiments thereof.

Furthering the general overview, some implementations of the modular multi-host system may be configured detect the presence of an object in the building using the distance measurements between host units, determine a vector of the detected object, differentiate between multiple users by various biometrics and body mechanics, establish a confidence level that the detected object (user) is authenticated, and establish a hierarchy of privileges for the user based on the level of authentication.

As described above, host units may communicate with other additional host units to determine a distance between them as well as each of their orientations to determine a floorplan. This can be done a single time (e.g., after initial installation) using the time-of-flight (TOF) of the communications signals (e.g., UWB) to determine the corresponding distances. However, when TOF is measured multiple times (e.g., periodically (e.g., 1 s intervals), aperiodically, continuously, intermittently, etc.), variations in the distance measurements may indicate the presence of an object in the room. When an object obstructs a particular line-of-sight measurement between host units, the communication signal (e.g., UWB) may pass through the object, which can change the TOF measurement. In addition, the communication signal may be observed to take an alternative path if the shortest direct path is blocked; this will also change the TOF measurement. For instance, if a distance between two host units is measured to be 2.5 m via TOF calculations and a sofa is subsequently placed between the two host units, obstructing the line-of-sight between them, the measured distance may change as the UWB signals may pass through the sofa at a slightly slower rate than in open air or because the received UWB signals traveled an alternate path. Changes may be on the order of millimeters or centimeters, depending on the type of obstruction and the geometry of the surrounding area. For the purposes of simplifying explanation, the line-of-sight communications between host units may be thought of as operating like virtual "trip wires" that "trigger" when an objects passes between them and changes their corresponding TOF measurement. To provide context, animate objects (e.g., humans, animals) may be expected to have a typical static distortion of approximately 4-25 cm. Non-conductive objects may be 1-4 cm. Some large conductive bodies (e.g., televisions) may obstruct the line-of-sight path entirely, consequently resulting in a measuring of a shortest reflection path (e.g., off of one or more walls or other reflective objects), which can be relatively small (e.g., 2-5 cm) or relatively large (e.g., one or more meters). Note that these examples are not limiting and smaller or larger values are possible depending on the type of object. Some embodiments may employ threshold triggers for object detection. For instance, some level of distortion may be expected, even when no object is obstructing the line-of-sight (LOS). To differentiate between expected system noise (i.e., EMI, natural phenomena or other interference, etc.), some minimum detected distance (e.g., 1 cm) may be used to differentiate objects from noise. In certain embodiments, phased arrays of antennas can be used at the host units and an angle-of-signal arrival can be detected, which can both be used to determine an orientation of the host unit with respect to the other host units, but also can be used to detect objects by examining an amount of distortion in the angle-of-signal arrival signal, as described herein with respect to the distance data.

In some embodiments, distance measurements may be a primary metric used for object detection. Alternatively or additionally, a second metric can be an increase in the variance of the signal. For two nodes, there may be some base variance (e.g., 1 cm$^2$). When an object is introduced into the path, especially a conductive object including human bodies, the variance may increase substantially. In some cases, the presence of a "still" human body may double or triple the variance. Alternatively or additionally, another metric can be a measured change in angle of arrival. The angular change might be situation dependent as the direct LoS path can give way to the primary reflection path. By way of example, a measurable change in the angle of arrival (e.g., +/−5 degrees) may indicate that the LoS path is obstructed.

In addition to a change in a measured distance, an amount of distortion in the measured signal, which can manifest as an amount of variation in a measured distance (e.g., snapshot measurements, measurements over time, etc.) can be used to determine a type of detected object. For example, a sofa may be constructed of uniform and inert materials, which can change the TOF measurement and measured distance, but the change may be relatively constant. On the other hand, a human being is comprised of solids and moving liquids, which can change the TOF measurement and corresponding determined distance, but can additionally exhibit relatively more distortion (e.g., continuous change) in the TOF measurements. These changes in the magnitude of a detected distortion in TOF measurements can be used to tell the difference between animate and inanimate objects, and is further discussed below with respect to FIGS. 14-15. In further embodiments, characteristics other than a magnitude of distortion can be used to determine a type of detected object. For instance, a frequency content of the noise/distortion between different object may be used, or the difference in distortion between two different sets of transmitter/receiver measurements can be used. One of ordinary skill in the art with the benefit of this disclosure would understand the many variations, modifications, and alternative embodiments thereof.

Figure 7:
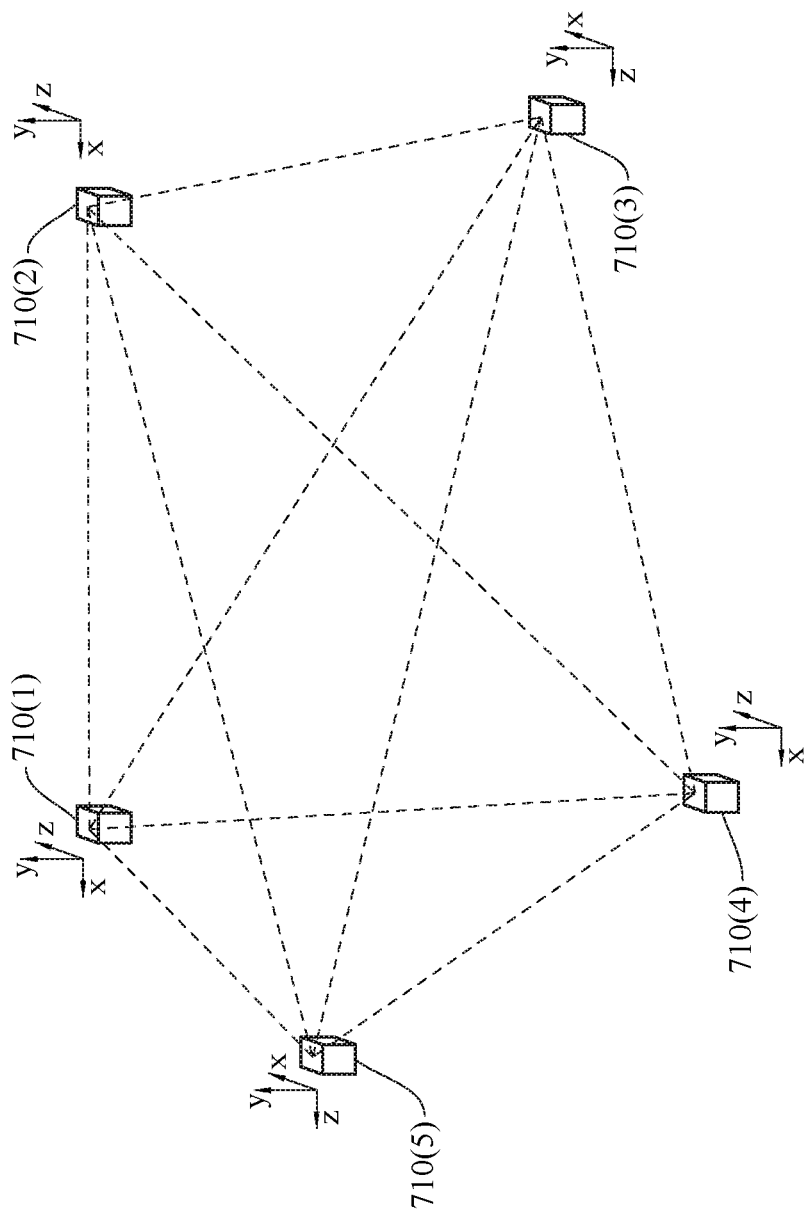
FIG. 7 shows a simplified diagram of a number of host units in communication with one another in a configurable home infrastructure, according to certain embodiments.

In some embodiments, a vector for the detected object can be determined in a number of ways. For example, multiple host units in communication with one another (e.g., as shown in FIG. 7 below) can create a mesh of virtual trip wires. As a user traverses a number of the virtual trip wires, a trajectory and speed can be determined, with potentially greater resolution and accuracy with a greater density of virtual trip wires, as shown and described below with respect to FIGS. 16-17.

In certain embodiments, two or more people (users) passing through a common virtual tripwire may be detected and differentiated based on one or more of their biometrics. For instance, consider the scenario where two people are walking toward each other and pass one another at a virtual tripwire. It may not be clear from the virtual tripwire measurement data if the two people passed each other and continued walking in the same direction, or if they stopped and turned around to back in the opposite direction. In such cases, biometrics such as a person's heart rate can be measured wirelessly (e.g., via a 60 GHz millimeter wave sensor (MWS) system) to differentiate between people, as shown and described below with respect to FIG. 18. Other characteristics can be used as well, including a person's detected speed, gate, size, or other features that may be particular to certain users.

In further embodiments, a detected user can be authenticated in a number of ways. For example, user data may be received that corresponds to the detected object (user). A confidence level can be assigned to the detected user based on a quality of the user data. For instance, a user's biometrics data (e.g., heart rate, iris data, fingerprint data, gate, size, etc.) may increase the confidence level that the detected user is who they purport to be. If the user has a cryptographic key, password, or other data, the confidence level can be increased as well. Certain permissions can be assigned to the detected user based on the confidence level. For example, if the user has a password only, then they may not be granted access to resources (e.g., home security controls, safe access, etc.) or certain areas of the home. If that user also has a cryptographic key and their detected heart rate matches characteristics of a stored heart rate associated with the user, then the confidence level may be high enough to grant full access to all resources and locations in the home, assuming that the particular user was authorized to do so, as shown and described below with respect to FIG. 19. In some cases, a detected heart rate, or any of the other methods of authentication, may be afforded higher or lower values of influence (e.g., weighted value) for affecting a determined confidence level. One of ordinary skill in the art with the benefit of this disclosure would understand the many variations, modifications, combinations, and alternative embodiments of the various concepts described above and throughout the remainder of this disclosure and would appreciate that any combination of these concepts may be possible unless expressly indicated otherwise.

To improve the understanding and purview of the embodiments that follow, some of the terms used throughout the present disclosure are described herein. A "floorplan" can be a representation (e.g., a digital representation) of a complete or partial structural layout of a building. A floorplan can be the same as a blueprint. The floor plan can represent the locations of various structures, objects, etc., within the building, including dimensions and locations, as well as distances between said structures and objects, as would be appreciated by one of ordinary skill in the art with the benefit of this disclosure. The floor plan can be an output (e.g., rendered on a display for a user, printed on paper) or a digital file accessed, updated, processed, etc., by the systems described herein.

A "support structure" can be a structural element of the building, such as the walls, floor, ceiling, support column, chimney, or the like. In some embodiments, the support structure may not be structurally integrated with the building and can include a table, chair, appliance, couch, cabinet, or the like. That is, host units can be integrated with (installed in, coupled to, etc.) any support structure and one of ordinary skill in the art with the benefit of this disclosure would understand that the embodiments described herein are not limited and other implementations, though not explicitly described, would still fall within the purview of the present disclosure.

A "building" can be any enclosure with one or more walls and may include residential, commercial, or industrial structures, structures with or without a ceiling or floors (e.g., a walled enclosure such as a stadium, tent structure, etc.), or the like. A building can be referred to as a "structure," not to be confused with a "support structure," as defined above.

A "modular accessory" can be an accessory that is a self-contained unit that, for example, can be repeatedly installed and removed from the host unit. A modular accessory may be referred to as a module, and examples of the various accessories are shown and described below at least with respect to FIGS. 3A-3B and 5A-5E. In some cases, certain embodiments may employ accessories that are not modular; that is, the accessory can be installed but is not necessarily easily installed/removed in the manner described in the embodiments that follow. One of ordinary skill in the art with the benefit of this disclosure would appreciate the many modifications, variations, and alternative embodiments thereof.

FIG. 1 shows a simplified diagram of a conventional wall-mounted power outlet 100 commonly found in residential, commercial, or industrial buildings or structures. Conventional power outlets are typically coupled to an alternating current (AC) power supply in a building, which can be sourced by an electrical power grid comprising power from a local power company, a renewable energy array (e.g., wind power, solar power, local generator, etc.), uninterruptible power supply system, or other suitable power supply and in any combination thereof. AC power is typically set to 120V at 60 Hz in North America, and 220V-240V at 50 Hz in Europe. The outlets and corresponding plugs used in each country are usually set by national standards, some of which are listed in the IEC technical report TR 60083.

Conventional power outlets have not changed much in terms of function or design for over a century. In the U.S., conventional power outlets are fixed and hardwired such that they cannot be easily modified without substantial retooling and disassembly. Referring to FIG. 1, power outlet 100 can include a faceplate 110, receptacle 120, and outlet box 130. Faceplate 110 is typically fastened to receptacle 120 via hardware (e.g., screws), receptacle 120 (terminal block) is typically mounted to outlet box 130 via retaining screws and may include terminal screws, grounding screws, or other hardware fixtures to secure and couple electrical wiring to receptacle 120. Generally, any modification to the electrical circuit will require some amount of additional circuitry (e.g., adding a universal serial bus (USB) circuit and socket) will likely involve substantial disassembly, rewiring, and replacement items (e.g., new receptacle 120 and/or outlet box 130) to accommodate the changes, and a thorough knowledge of the relevant portions of the National Electric Code (NEC) to ensure compliance. More fundamental changes (e.g., replacing a power outlet with a thermostat controller or sensor device) would require even more specialized knowledge including installation and wiring of the new hardware and corresponding infrastructure. As such, conventional wall outlets are fixed, hardwired, and generally not modifiable without significant time, equipment, and experience to comply with the NEC. In some jurisdictions, modifications may not be allowed by a user. Local codes may require a licensed electrician and/or permits to perform such modifications.

Exemplary Host Unit and Modular Accessories

In contrast to the fixed and hardwired conventional implementation of an electrical power outlet described above, aspects of the present invention can include a host unit (also referred to as a "host device" or "host module") that can be configured to couple to (and non-destructively decouple from) a modular accessory to provide electrical power and other functional capabilities as described below. The host unit is configured as a universal socket to receive a uniformly sized modular accessory housing, which can contain any suitable functional capabilities (e.g., see FIGS. 5A-5D).

In some implementations, the host unit may be sized to be retrofitted inside existing cavities where conventional electrical power outlets, switches, and/or electrical fixtures are located in a building (e.g., residential home). However, host units and their corresponding modular accessories may be configured in any suitable size, dimension, shape, and/or contour.

Figure 2A:
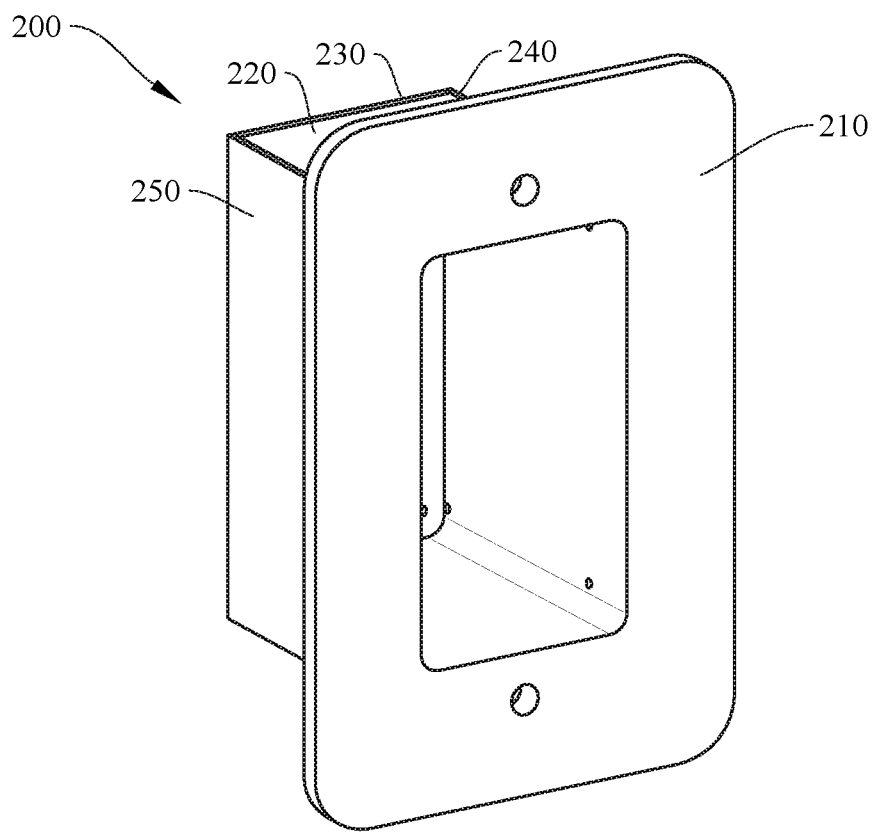
FIG. 2A shows a simplified diagram of a wall-mounted host unit, according to certain embodiments.
Figure 2B:
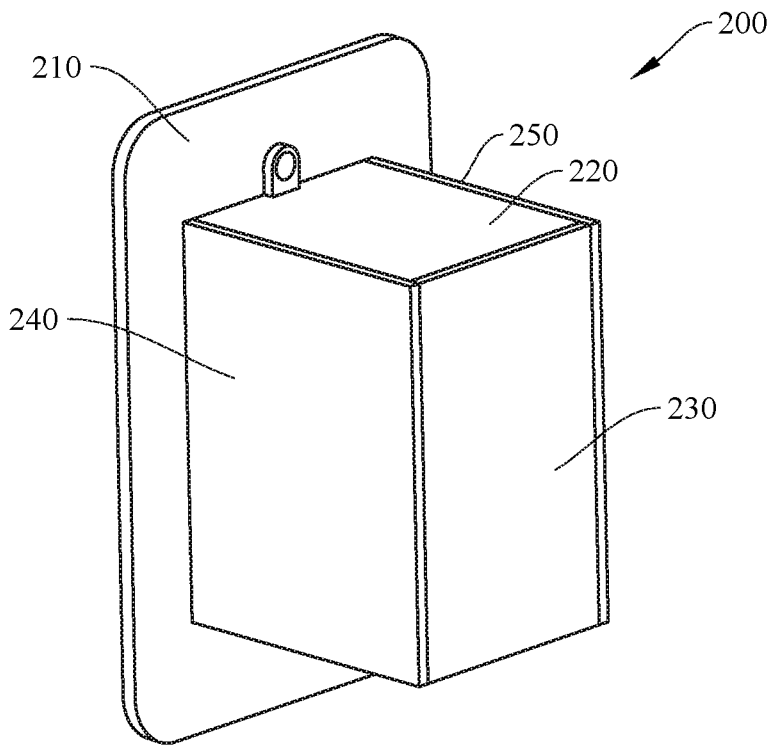
FIG. 2B shows a rear view of a simplified diagram of a wall-mounted host unit, according to certain embodiments.

FIGS. 2A and 2B show simplified diagrams of a host unit 200, according to certain embodiments. Host unit 200 can include a faceplate 210 and sleeve insert ("sleeve") 220. Sleeve 220 can be configured to form a cavity that extends rearwards from and normal to the surface of faceplate 210. Sleeve 220 can be operable to receive and secure a modular accessory such that when host unit 200 is installed and embedded in a support structure (e.g., wall), faceplate 210 can be flush or substantially flush (e.g., offset and parallel) to the surface of the support structure with sleeve 220 embedded therein. Note that the support structure will be referred to in the following examples as a wall, but it should be understood that a support structure can also include a floor, a ceiling, a column, a pillar, a half-wall, an appliance, or any other suitable building structure that can provide the appropriate electrical infrastructure (e.g., AC power), as would be appreciated by one of ordinary skill in the art with the benefit of this disclosure. Further, some of the examples provided herein may refer to the building as a "home," however it should be understood that "building" may refer to any residential, commercial, or industrial structure or dwelling.

In some embodiments, sleeve 220 may include a junction board 230, controller board 240, and power gating board ("power gate") 250, among other boards, modules, and/or features. Controller board 240 can include a microcontroller and a communication module configured to determine relative distances to other host units via suitable communication protocol (e.g., UWB, radar, ultrasound, etc.). In some cases, the controller board 240 may include an IMU, accelerometer, compass, magnetometer, one or more antennas, or the like to determine a self-orientation in 3D space. Power gate 250 may be configured to couple electrical power (e.g., AC and/or DC power) from an electrical source (e.g., electric utility grid, generator, local renewable resource (e.g., solar system), or the like) to the modular accessory. In some embodiments, junction board 230 can further couple Ethernet data lines (e.g., copper, fiber optic cables, etc.) or other type of data line to the modular accessory. In some cases, the electrical power and data lines may not physically couple to host unit 200 as an intermediary node and can operate as a pass through device, such that host board 200 does not actually receive or interface electrical power or data. Junction board 230 can include hardware, harnesses, contact boards, connectors, or the like to facilitate physically and electrically mating host unit 200 with a modular accessory. More details about the various components of boards 230-250 are shown and described below with respect to FIG. 4. Although boards 230-250 are shown to occupy a certain area of sleeve 220, it should be understood that the various components, boards, modules, etc., may be productized to accommodate any suitable size, dimensions, layout, or other design metric. One of ordinary skill in the art with the benefit of this disclosure would understand the many variations, modifications, and alternative embodiments thereof.

Figure 3A:
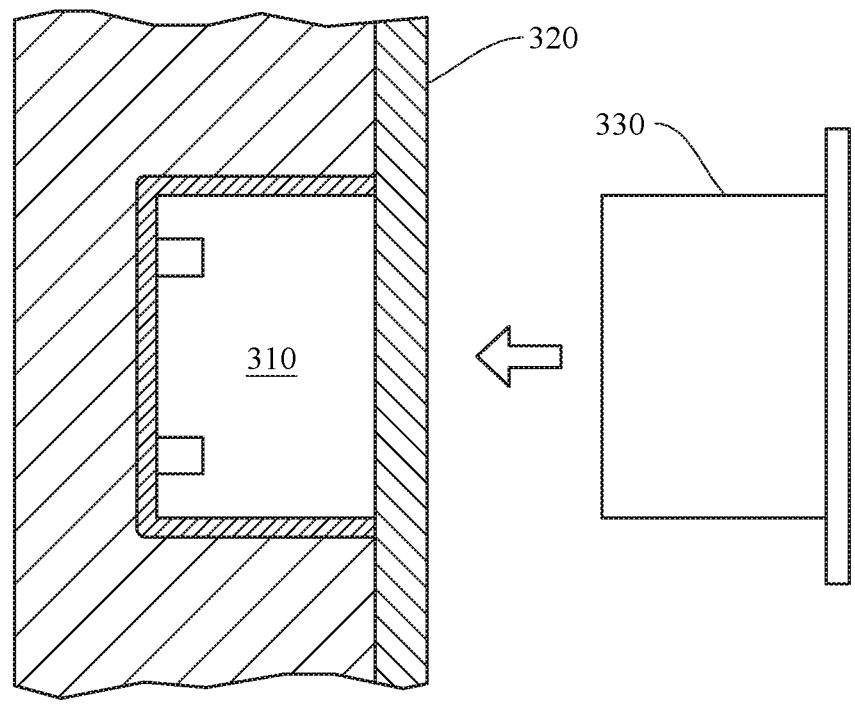
FIG. 3A shows how a modular accessory can be coupled to a wall-mounted host unit, according to certain embodiments.
Figure 3B:
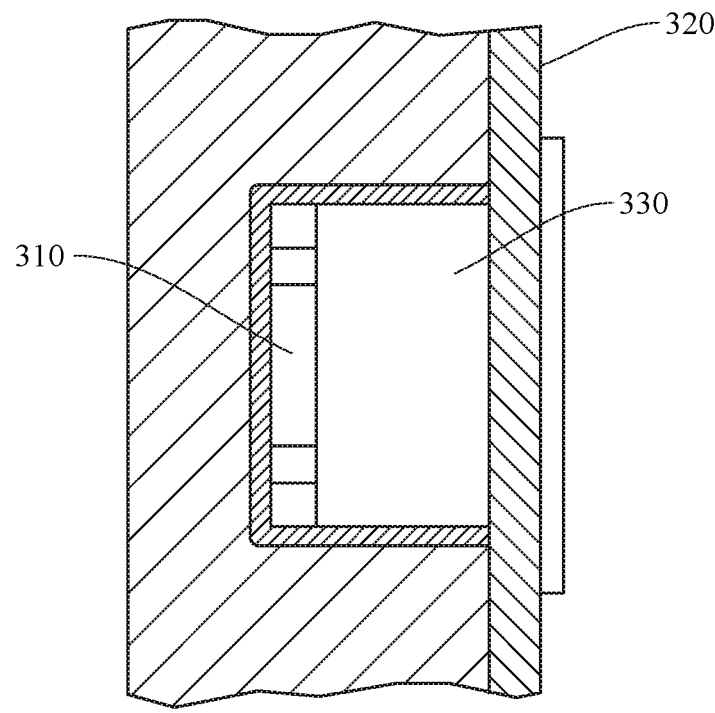
FIG. 3B shows how a modular accessory can be coupled to a wall-mounted host unit, according to certain embodiments.

FIGS. 3A and 3B show how a modular accessory 330 can be coupled to a wall-mounted host unit 310, according to certain embodiments. Host unit 310 is shown as installed and embedded in building support structure (e.g., wall 320). Modular accessory 330 can be coupled to host unit 310 by sliding into a sleeve (cavity) via a frictional fit, tracks or insert guides, or other suitable method. Host unit 310 may be connectorized such that modular accessory 330 physically and electrically couples to host unit 310 when fully inserted. Alternatively or additionally, wire harnesses or other methods of mechanically and/or electrically coupling modular accessory 330 to host unit 310 can be used. In some cases, when modular accessory 330 is fully inserted and mechanically/electrically coupled to host unit 310, modular accessory 330 may be configured to be flush against a surface of the wall, as shown in FIG. 3B. Host unit 310 and modular accessory 330 can be of any suitable form factor and can couple to support structure 320 in any suitable arrangement. One of ordinary skill in the art would understand the many variations, modifications, and alternative embodiments thereof.

Figure 4:
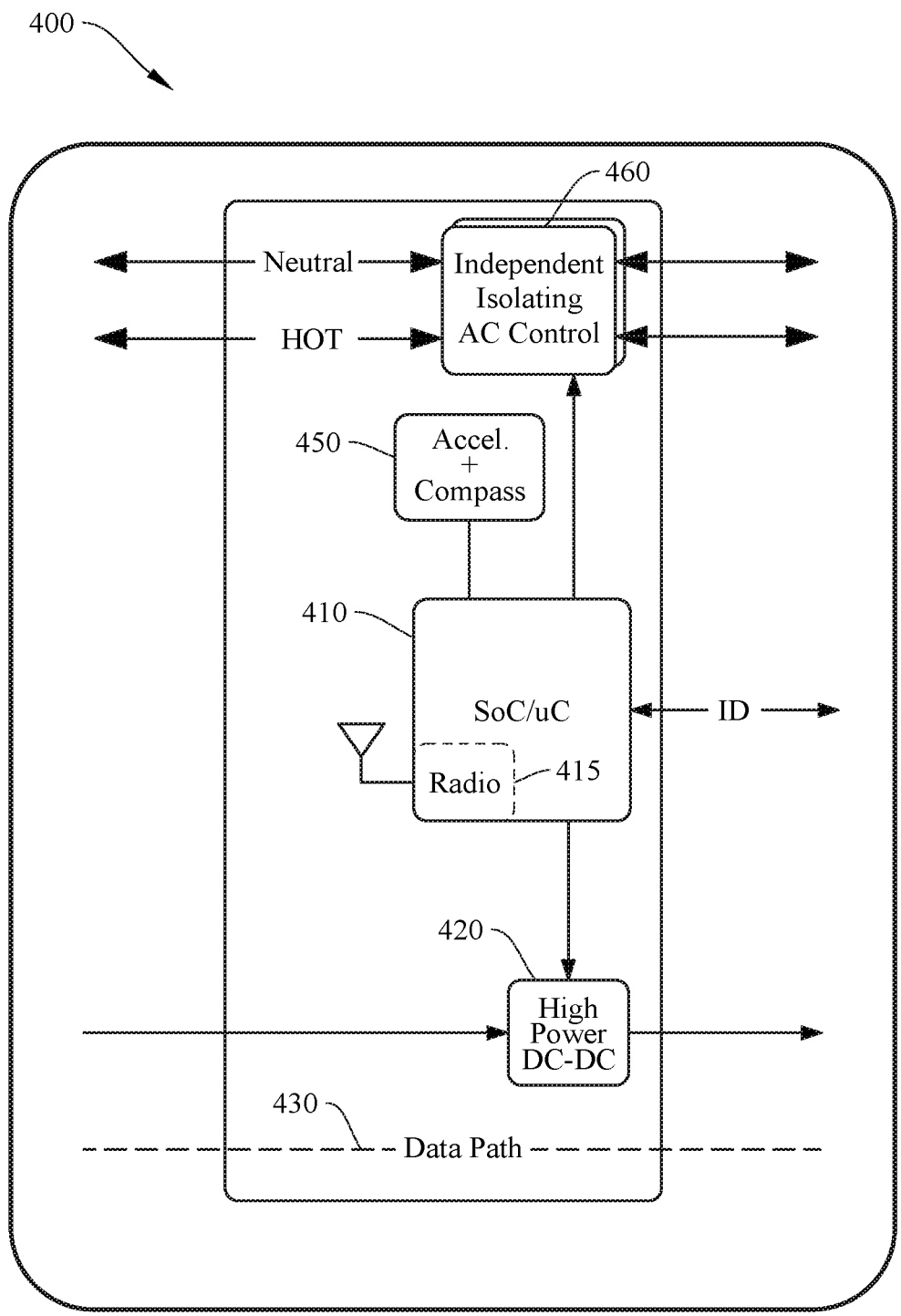
FIG. 4 shows a simplified block diagram of a system for operating a host unit, according to certain embodiments.

FIG. 4 shows a simplified block diagram of a system 400 for operating a host unit, according to certain embodiments. System 400 may include a controller block 410, DC power block 420, data path 430, self-orientation detection ("orientation") block 450, and power gating block 460. In certain embodiments, controller block 410 may include one or more microcontrollers (MCUs) and can be configured to control the operation of system 400. Alternatively or additionally, processor 410 may include one or more microprocessors (μCs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, and the like, may be configured in other system blocks of system 300. Microcontroller block 410 may include a radio 415 and antenna system to communicate with one or more additional host units via UWB, radar, ultrasound, RF, Bluetooth, Bluetooth LE, synchronous (or asynchronous) IR blaster, ZigBee, Z-Wave, or other suitable communication protocol. Radio 415 can be used to determine a relative distance and ranging from the host device to the one or more additional host devices in a building (e.g., via time-of-flight calculations, received signal strength indicator (RSSI) measurements, etc.). In some embodiments, the host unit collects the raw communication data and another entity (e.g., brain) performs the distance calculations, as further described below at least with respect to FIGS. 11A-11C. Furthermore, any suitable communication protocol can be used for communication between host units and corresponding modular accessories. For instance, a wireless communication protocol, such as near-field communication (NFC) protocol may be employed in the embodiments described in the present disclosure, or any other medium of communication, as would be appreciated by one of ordinary skill in the art with the benefit of this disclosure.

In some embodiments, microcontroller block 410 may can include a DC universal asynchronous receiver/transmitter (UART) to provide a DC communication path between the host unit and modular accessory to allow the modular accessory to automatically bootstrap itself when plugged in. For example, in some embodiments, the microcontroller may query the modular accessory when connected to identify what it is, identify its capabilities, provide the modular accessory credentials (e.g., Wi-Fi login name, password, etc.), etc., to allow the modular accessory to self-power and bootstrap itself automatically without any user interaction. In some embodiments, an alert can be sent to a user (e.g., home owner via SMS text) requesting permission to accept and configure the modular accessory.

DC power block 420 can provide 100 ma-2 A@5V to power the basic features of a one or more blocks of the host unit and modular accessory (e.g., MCU, Radio, etc). When the modular accessory is inserted, the host can enable<100 mA power delivery (see, e.g., element 612 of FIG. 6) to allow the modular accessory to boot up. The module may then request additional power to enable the rest of its functionality (see, e.g., element 616 of FIG. 6). After authentication, the host unit can enable full power mode and allow the modular accessory to bring up all of its components, as further discussed below with respect to FIG. 6.

In some cases, DC power block 420 can be configured to enable higher power DC delivery (e.g., USB-C@100 W or 48V@1 kW, or other suitable power requirement). In some implementations, only DC power may be provided by a host unit. For instance, there may be relatively few classes of devices that operate directly on AC power, such as resistive heaters and lights (e.g., stoves, space heaters) and induction motors (e.g., vacuums, pumps, compressors, refrigerators, etc.). Many consumer devices may rely on a "wall-wart" (transformer box) for AC/DC conversion, and would benefit from a direct DC power source rather than AC as they could connect to the wall with just a cable. For example, some laptops may use an 85 W AC/DC converter with a USB-C connection from the converter to the laptop. With DC power delivery in the host unit, the converter could be removed and the laptop could be powered by a USB-C cable connected directly to a modular accessory. In some home implementations, floor level host units may be configured to provide AC power to large appliances, and mid or high level host units may be configured to provide DC only to control light switches/sockets (e.g., DC-driven LEDs), controls, sensors, or the like. However, any suitable implementation of AC only, AC/DC, and DC only infrastructure can be used, as would be appreciated by one of ordinary skill in the art with the benefit of this disclosure.

In some embodiments, two DC power blocks may be employed instead of one (depicted in FIG. 4). For example, a low-power DC block may be dedicated for powering a modular accessory and a second high-power DC block may be configured to power appliances or other high-power devices. For instance, the low-power DC block may be active on each host unit (or a subset thereof), and it would provide enough power to power the essential parts of the host unit and/or modular accessory (e.g., MCU, radio, sensors), but not elements that are high power (e.g., lights, touch screen/display, digital content manager (e.g., Apple TV®)) or devices that are plugged into the modular accessory. In some cases, a UART connection may be implemented as a separate electrical connection, or layered as a single wire protocol carried on the low-power DC connection. Modules that have high power elements, or devices plugged into a module that need more power may require that the module either integrate an AC/DC converter and connect to block 460, or connect to block two (high-power DC). One, two, or more DC power blocks can be used in any combination of function or use, as would be appreciated by one of ordinary skill in the art with the benefit of this disclosure.

Data path 430 can be copper cables, fiber optic cables, coaxial cables, or other suitable data traffic medium. In some embodiments, data path 430 may not directly couple with the host unit, where the host unit operates as a pass through entity allowing data to travel directly from the data source to the modular accessory. This may be advantageous as communication technology continually improves, increasing data rates and bandwidth capabilities will not be hampered or affected by aging technology in the host unit.

There may be many different implementations to mechanically, electrically, and/or optically coupling to a networking source. For instance, in mechanically-based embodiments, a fiber optic cable can be mechanically attached to the host unit, with the end of the cable exposed so the modular accessory could make optical contact. In some cases, a fiber optic network may be opaque to the host (e.g., there can be a mechanical shutter on the host unit to gate the end of the fiber so the laser is not exposed without a modular accessory plugged in). In certain embodiments, one of fiber, Ethernet, USB-C/Thunderbolt, etc., can be coupled to the host unit, which would undergo a 1:1 conversion to an electric signal (in the case of fiber) without requiring a decoding of the protocol. That is, the signal can be passed to electrical-to-optical couplers or an optical lensing solution, which can be positioned to optically couple the output to an inserted modular accessory. The received signal can then be reconverted to the appropriate network physical interface and decoded on the modular accessory.

Orientation block 450 can be used to determine an orientation of the host device in 3D space. Orientation block 450 can include an accelerometer, gyroscope, magnetometer, compass, IMU, one or more antennas, or other suitable device. In certain implementations, an accelerometer is used to determine the direction of gravity (normal vector), and a compass (e.g., magnetometer) is used to determine the orientation of the host device relative to the normal vector. Although the embodiments described herein associate location (distance) and orientation detection with the host unit, it should be understood that location and orientation detection devices can be alternatively or additionally included in the modular accessory. In some embodiments, multiple antennas (e.g., a multi-antenna array) can be included in host unit 400 and may be configured to communicate with one or more additional host units, each configured with multiple antennas. In such embodiments, communication data can be sent and received between host units and an orientation of the host units with respect to one another can be determined because each set of multiple antennas can operate as a phased array such that a phase angle of arrival of the communication data can be determined, which can correspond to said relative orientations of the host units. Such embodiments with multiple antennas (also referred to as "phased arrays" or a "phased antenna array") can be implemented in addition to or in replace of the accelerometer and compass implementations discussed throughout the present disclosure.

Power gating block 460 can control the coupling of electric power (e.g., AC power) from a power source (e.g., electric utility grid, local renewable energy resource, generator, energy storage device, etc.) to the modular accessory. Gating may be implemented via an on-board relay that can be turned on and off based on the connection status between the host unit and modular accessory. For example, AC power can be turned on (allowed to pass from the power source to the modular accessory) in response to the modular accessory being mechanically and/or electrically coupled to the host unit. Conversely, AC power can be turned off when the modular accessory is electrically and/or mechanically removed from the host unit. This can serve as a safety mechanism so that a user cannot be electrocuted when touching an empty (uncoupled) host unit. In some embodiments, power gating block 460 can be configured to sense voltage, current, frequency, and power factor of AC power delivery.

It should be noted that the host unit, in some examples, is intended for long term operation (e.g., 40+ years) and is designed such that its functions will not age out as new technology continues to develop. This can be advantageous as the host unit installation process is likely to occur once, such as when a home or commercial building is built, or when an electrical system is replaced or overhauled, as the host unit typically requires specialized knowledge for NEC compliance. Conversely, any number of modular accessories can be easily installed (e.g., plugged in), removed, and replaced by a user as new technologies are developed and integrated therein. Some of the host unit functions that are not likely to change for potentially decades include the authentication and bootstrapping process, the AC gating, and the ranging/orientation capabilities, although some embodiments may still include upgrades for ranging and orientation, which may supersede or augment existing hardware in the host unit. The authentication/bootstrapping process can be limited to processing, communicating, and storing of very small amount of data (e.g., 10 KB) and may not change over time. AC power will presumably remain the same for decades to come, as conventional wall sockets have performed that same function for over 100 years. Similarly, the relay and control circuit to engage/disengage AC power with the modular accessory can have a long operating life. However, some embodiments may allow certain components (e.g., the AC gating relay, microcontroller, crypto-coprocessor, authentication module, secure enclave modular, etc.) to be socketed and user-accessible for part replacement if necessary. In some embodiments, providing a pass through for data cables may not need any upgrades for decades as the host unit does not operate as a node in the data path, as further described above. This can be particularly true with fiber optics, as contemporary electronics has not reached a full utilization/bandwidth of this communication medium and further improvements will be made in the coming years. Technological advances and upgrades may occur in the modular accessories and/or brain of the home, which can be easily be installed/removed as needed without rewiring, configuring, or adjusting the host units.

Figure 5A:
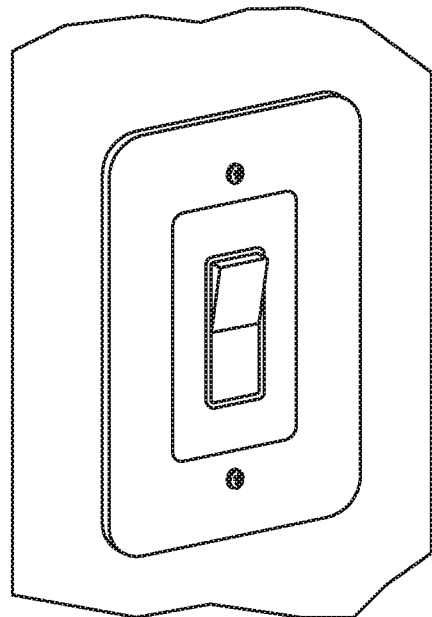
FIG. 5A shows a simplified diagram of a typical modular accessory, according to certain embodiments.
Figure 5B:
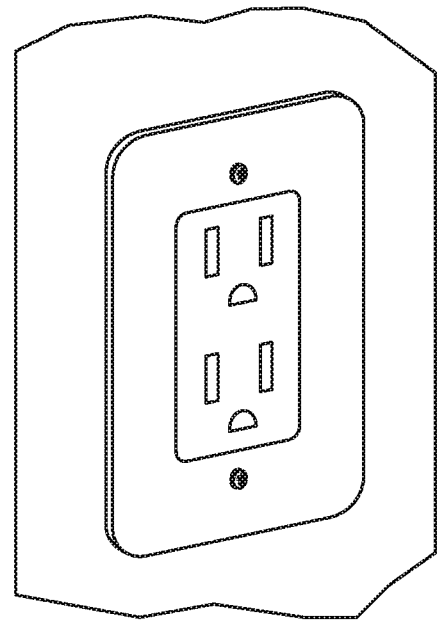
FIG. 5B shows a simplified diagram of a typical modular accessory, according to certain embodiments.
Figure 5C:
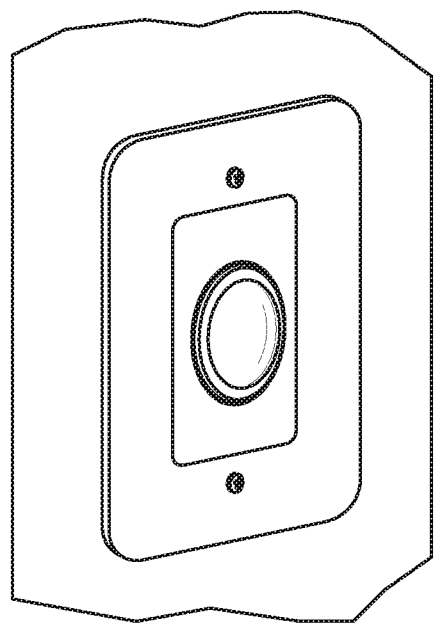
FIG. 5C shows a simplified diagram of a typical modular accessory, according to certain embodiments.
Figure 5D:
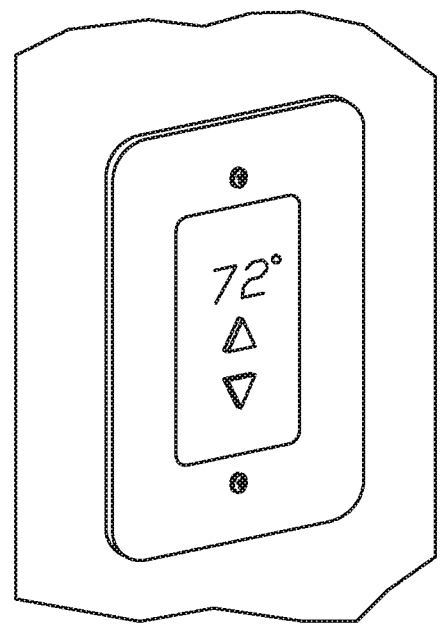
FIG. 5D shows a simplified diagram of a typical modular accessory, according to certain embodiments.

FIG. 5A-5D include a set of simplified diagrams showing some typical modular accessories, according to certain embodiments. Modular accessories can include any electronic device that utilize the electrical power and data provided by a host unit. Some examples include a control switch (e.g., for switching or dimming a light) as shown in FIG. 5A, a power outlet as shown in FIG. 5B, an image sensor as shown in FIG. 5C, a thermostat controller as shown in FIG. 5D, or the like. Other examples can include an occupancy sensor, baby monitor, touch screen/home control panel, an AC/DC converter, a digital content manager (e.g., Apple TV®), wall speakers (e.g., standalone or HomePod configurations), an in-wall dedicated digital assistants (e.g., Amazon Echo®, Google Home®, etc.), 60 Ghz transceiver for wireless connections to devices within a room (e.g., AR/VR headsets, HDMI to TV, Wireless computer monitor, etc.), security cameras (standard or privacy secured camera/sensor), phone docks (e.g., for wireless charging, syncing a smart phone/wearable to a house), lights (e.g., sconces, light sockets, etc.), security system interfaces, wireless routers/modems, NAS, and more, as would be appreciated by one of ordinary skill in the art with the benefit of this disclosure.

Figure 5E:
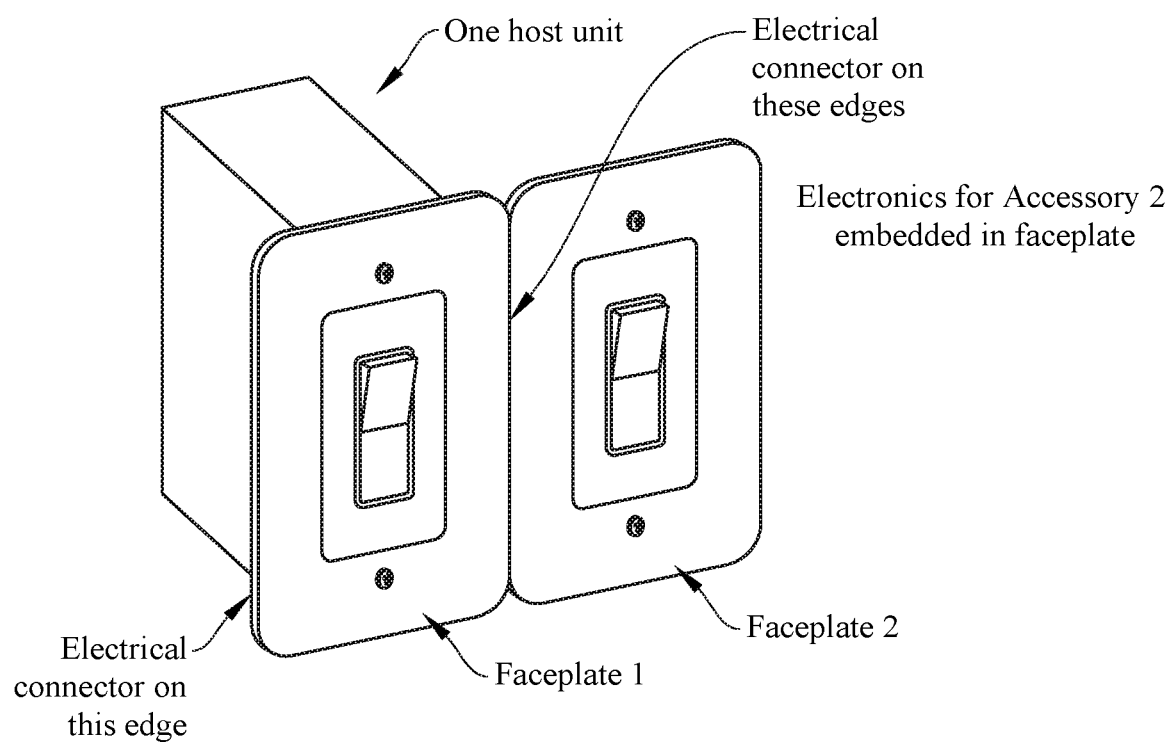
FIG. 5E shows a simplified diagram of multiple modular accessories integrated with a single host unit, according to certain embodiments.

In further embodiments, some wall plates can be extended to support multiple modular accessories (e.g., for switches, outlets, etc.) without requiring multiple adjacent host units. In a conventional wall unit (as shown in FIG. 1), this would not be possible as two gang junction boxes would be needed to fit two switches next to each other. Thus, some embodiments may employ an electrical connector on any side of a faceplate of the modular accessory (e.g., with a method of mechanically coupling them via hardware, magnets, etc.), so that an additional and potentially different type of modular accessory can be connected, as shown in FIG. 5E. Modular accessories may be a thin variant as shown (effectively just the faceplate) that can snap onto either side of an existing modular accessory. Such embodiments can allow for a single host unit to couple to a single modular accessory that can then be extended to multiple additional modular accessories (e.g., switches, control panels, sensors, etc.) that can couple to the single modular accessory, as shown in FIG. 5E. One of ordinary skill in the art with the benefit of this disclosure would understand the many variations, modifications, and alternative embodiments thereof. In further embodiments, adjacent accessories may be electrically, magnetically, and/or communicatively isolated from one another.

Automatic Bootstrapping of a Modular Accessory

Figure 6:
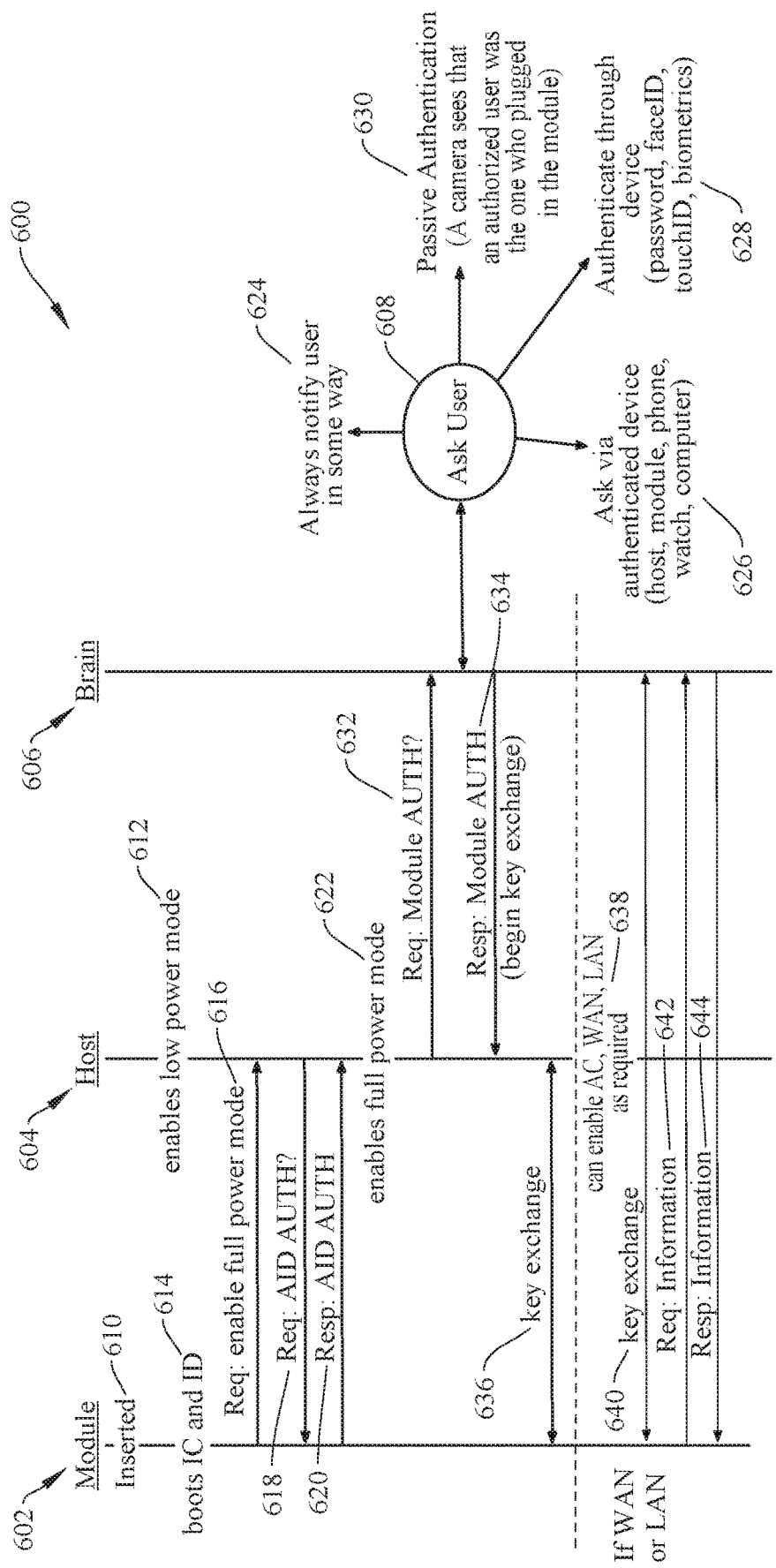
FIG. 6 shows a sequence chart showing an operation of a bootstrapping protocol for modular accessories, according to certain embodiments.

FIG. 6 shows a sequence chart 600 showing an operation of a bootstrapping protocol for modular accessories, according to certain embodiments. Sequence chart 600 depicts communications and functions between a modular accessory 602, host unit 604, brain 606, and user 608. Brain 606 may be a computing device (e.g., desktop computer, mobile device, smart device, laptop computer, etc.) to perform some or all of the data heavy computations including determining relative locations of the host units relative to one another, determining the orientations of the host units, determining a floor plan based on the raw distance data, and other functions, as further described below with respect to FIGS. 7-13. It should be noted that the following set of sequences corresponds to certain embodiments, and other sequences and/or minor changes or modifications are possible, as would be appreciated by one of ordinary skill in the art with the benefit of this disclosure.

At 610, modular accessory 602 is inserted into host unit 604, which enables a low power mode of operation (612) to provide mobile accessory 602 with a baseline of resources (e.g., DC power) to power up and begin the authentication process. At 614, modular accessory 602 boots its on-board microprocessor and accesses an identification database using the available lower power provided by host 604. Mobile accessory 602 may then request permissions and resources from host unit 604 to enable a full power mode (616). At 618, host unit 604 requests ID authentication data from modular accessory 602. Modular accessory 602 may retrieve the ID authentication data from the identification database and provide it to host 604 (620). In response to determining that mobile accessory 602 is authenticated, host 604 can enable a full power mode to modular accessory 602 (622). For example, host unit 604 may provide AC power, high power DC, and Wi-Fi and/or Ethernet access to modular accessory 602 once authentication is confirmed. In some embodiments, the ID authentication request (618) and response (620) can occur before the request for full power mode (616). More specifically, enabling low power mode of a modular accessory (612) may occur immediately before or in lieu of authentication.

In some embodiments, a modular accessory may be fully authenticated so that the system can identify its ID, functions, resource requirements, etc., however it may still need to be authorized. For instance, at 632, host 604 may query brain 606 to authorize modular accessory 602 to be added to the system network (e.g., system 400). In some instances, brain 606 may interface with a user for final approval of the authorization. For instance, at 624, the system may notify a user that a modular accessory has been connected and is requesting authorization and resources. Notification can be made via SMS text, email, voice call, local audio and/or video notification, or other suitable method of alerting the user. In some cases, authentication may require a user response approving the requested installation and authentication. In some cases, the user can be queried via an authenticated device, such as the host, another authenticated module, a smart device, smart wearable, computer, or the like (626). Some embodiments may authenticate after the user is authenticated through an authenticated device, which may occur via password, faceID®, touchID®, biometrics, voice recognition, or the like (628). Alternatively or additionally, a passive authentication algorithm can be used to authenticate the installation and configuration of modular accessory 602. For example, a camera or image sensor can visually identify that an authorized user is the person plugging in module 602 (630). In certain embodiments, different users may have different levels of authorization. For example, User A may be allowed to install any module with a visual ID, User B may be required to authenticate using an external method (e.g., phone, touched), and User C may only be allowed to visually authenticate switches, but any other type of modular accessory (e.g., power outlet or speaker) would require external authentication. One of ordinary skill in the art with the benefit of this disclosure would understand the many variations, modifications, and alternative embodiments thereof.

Once authorized (e.g., automatically or per user approval), brain 606 may respond to host 604 indicating that the authorization for modular accessory 602 is granted (634) and host 604 can freely exchange keys with modular accessory 602 (636). At this point, AC, high power DC, WAN access, LAN access, Wi-Fi, etc., can be provided to modular accessory 602 via host 604 and key exchanges, data requests, etc., can be provided by brain 606 (steps 638-644).

Host Unit Ranging, Self-Orientation Detection, and Auto-Floorplan Generation

FIG. 7 shows a simplified diagram of a number of host units in communication with one another in a configurable home infrastructure, according to certain embodiments. Each host 710(1)-(5) (or a subset thereof) can be communicatively coupled to one another via any suitable communication protocol, such as UWB, radar, ZigBee, Z-Wave, Bluetooth, BTLE, ultrasound, LIDAR, laser, any suitable optical communications protocol, or the like. A distance between the host units can be derived from the communication signals (e.g., via time-of-flight calculations, RSSI, phase-shift, etc.). Alternatively or additionally, a host unit can determine if it shares a wall cavity with another host unit, as well as if it shares a joist/stud cavity with another host unit, via the communication signals and/or IMU (e.g., vibration detection). In some cases, the computations to determine the distances may be performed at the host units, by installed modular accessories, by aggregators, by a system brain, or a combination thereof. Each host unit may further determine their orientation in 3D space, as described above. In certain implementations, one host unit or a subset of the total number of host units may communicate with each additional host unit in a building for a different communication infrastructure, as would be appreciated by one of ordinary skill in the art with the benefit of this disclosure.

Figure 8:
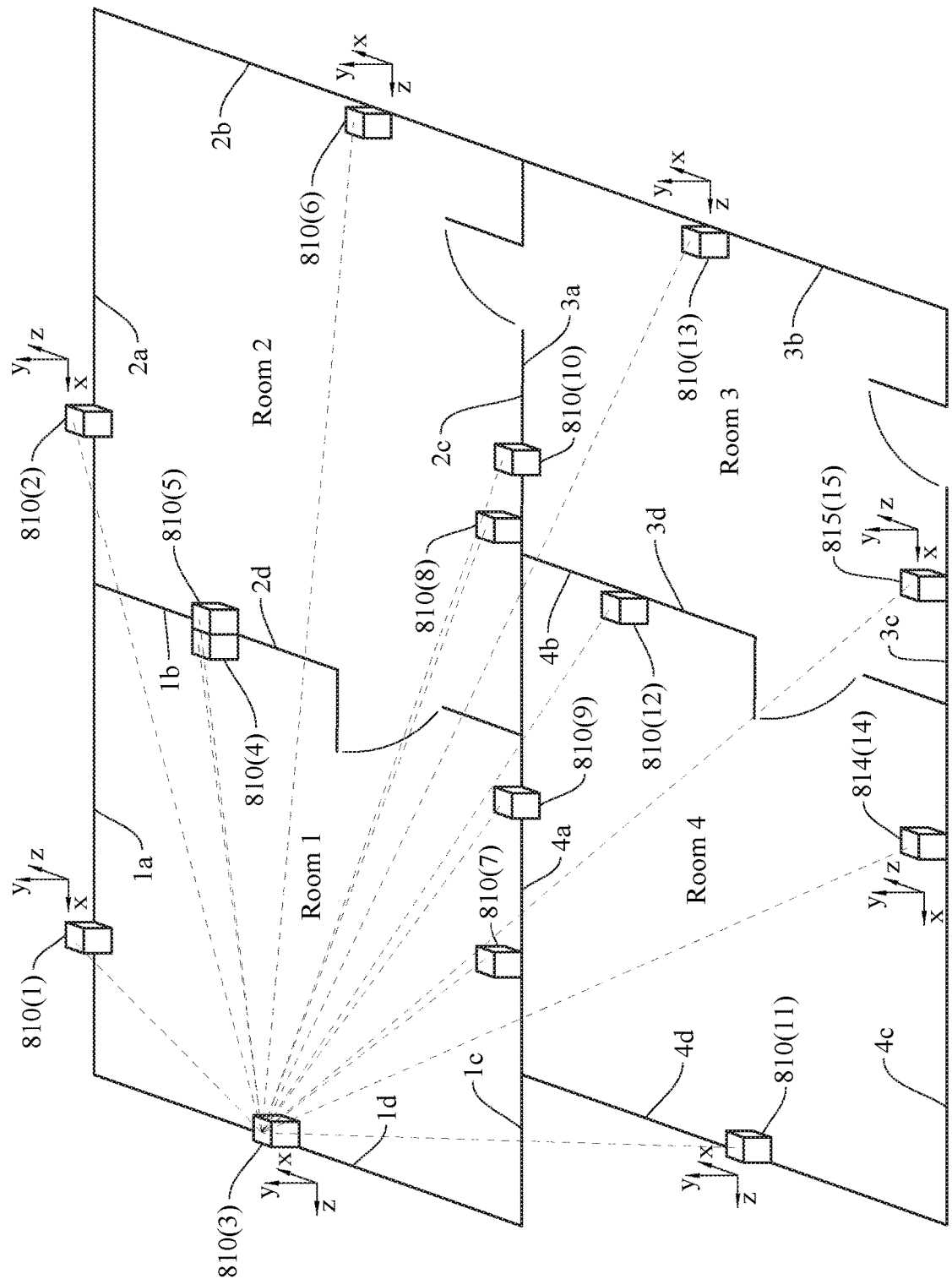
FIG. 8 shows a simplified diagram showing an automatically generated floorplan for a home, according to certain embodiments.
Figure 9A:
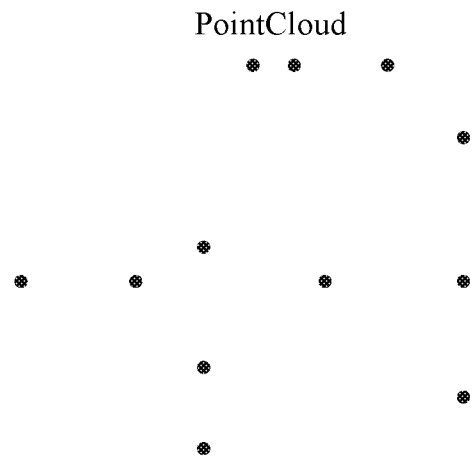
FIGS. 9A-9C show various stages of determining a floorplan for a building, according to certain embodiments.

FIG. 8 shows a simplified diagram showing an automatically generated floorplan for a home, according to certain embodiments. The building includes four rooms (Rooms 1-4), with each wall having four walls (a-d). Each host unit 810(1)-(15) or subset thereof may be in communication with one another and relative distance data can be determined based on time-of-flight measurements between each host device. Alternatively or additionally, a relative orientation of host units can be determined using a phase angle of arrival when the radio consists of multiple antenna elements (e.g., phase array) configured to enable the collection of this information. Each individual host unit may represent a single point in a point cloud, as represented in FIG. 9A. Each host unit can further include orientation data, which can be used to determine a direction that the host unit is facing in each room.

Figure 9B:
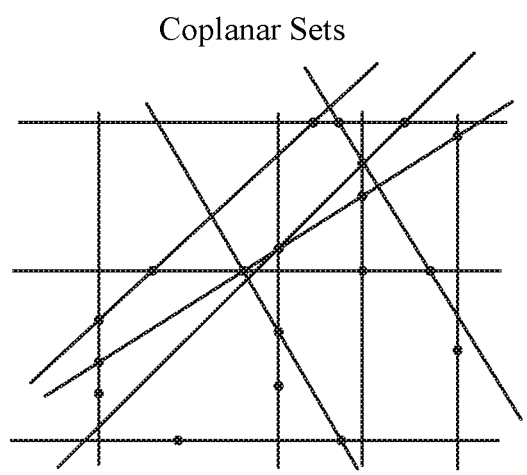
Figure 9C:
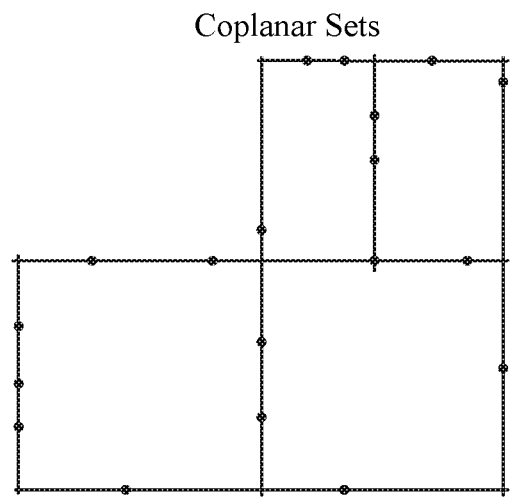

In certain embodiments, the relative distance data and detected corresponding relative locations of each host unit can be used to automatically generate a floorplan. For example, a plurality of host units (e.g., 3 or more) that are determined to be co-linear along a same or substantially same plane can be used to identify a potential wall in the floorplan model, as shown in FIG. 9B. A potential wall can also be determined by sets of host units that share a wall, joist, or stud cavity. In some aspects, a co-linear plurality of host units configured in orthographic planes may be used to define walls in a floorplan model, as shown in FIG. 9C. In certain embodiments, the systems can use a sketched model of the floorplan (e.g., stored in a database) and use distance data from the home units to refine and fit the walls to the same general shape. Other methods of point cloud analysis (e.g., least squares) can be used to determine the location of walls in a home and one of ordinary skill in the art with the benefit of this disclosure would understand the many variations, modifications, and alternative embodiments thereof.

In some arrangements, two or more host units may appear to have point locations that are co-located at a same location or substantially the same location (e.g., within 30 cm from one another). It may be possible that the host units are configured in immediately adjacent locations on the same side of a common wall or on opposite sides of a common wall. In such cases, orientation data may be used to resolve these types of indeterminate scenarios. For example, referring to FIG. 8, host unit 810(4) and 810(5) may represent two points in a point cloud that are very close in proximity. If their measured orientations are determined to be facing opposite direction, the corresponding floorplan model may be configured to place the host units on opposite sides of a common wall. If the orientations are determined to be facing the same direction, then the floorplan model may place the host units on the same side of a common wall. For example, the host units may be configured side-by-side (e.g., control switch and thermostat), or vertically displaced, but in the same or substantially the same X-Y location in the floorplan (e.g., a control switch configured at 1 m from the floor, and a power outlet at 0.2 m from the floor).

In some embodiments, modular accessory functionality can be used to improve the accuracy of an auto-generated floor plan. For example, some modular accessories may include an ambient light sensor (ALS). If the smart home is aware that a light is on in Room 1 and the modular accessory for host 810(4) detects the light, then the floorplan may reflect that host unit 810(4) is located in Room 1. Conversely, if the modular accessory for host unit 810(5) does not detect the light, then the floorplan can reflect that host unit 810(5) is located in Room 2 because the light would not reach that location with the intervening wall. In another example, audio from a television in Room 1 may be periodically detected at different sound levels by a microphone embedded in a modular accessory coupled to host 810(8), which may be determined to correspond to a door opening on the wall (1b/2d) separating Rooms 1 or 2. Other floorplan enhancing and/or supplementing implementations are possible, as would be appreciated by one of ordinary skill in the art with the benefit of this disclosure.

In summary, certain implementations of floorplan generation may use "ranging only" and "ranging and orientation"-based systems, and may further incorporate implementations using supplementary sensing and/or other techniques, as described in the non-limiting summaries that follow. Note that an angle of arrival can be incorporated into the following enumerated summaries to further determine ranging and/or orientation, as would be appreciated by one of ordinary skill in the art with the benefit of this disclosure.

Overview of Floorplan Generation Using Ranging Data

1. Obtain distance for all of a subset of possible host-host pairs using wireless ranging.
2. Create a point cloud using a least squares error-based Trilateration algorithm or other suitable substitution, as would be appreciated by one of ordinary skill in the art.
3. From the point cloud, generate a list off sets of three or more hosts that are coplanar.
4. Create a set of possible walls (lines) from the coplanar set, and determine the intersection angle of the pairs (e.g., see FIG. 9B).
5. Build an estimate of the floorplan by constraining set of possible walls to those that are orthogonal to each other (e.g., see FIG. 9C), and eliminate edges that are not enclosed. Note that, with just wireless ranging, the waveguide characteristics of wall cavities allow for further identification of host units that share that a wall cavity. This can be used to increase the accuracy of the floorplan estimate by further constraining the set of possible walls. In some embodiments, a floorplan can be generated using a maximal set of possible orthogonal walls. In some cases, the walls may not need to be orthogonal to be determined to be a wall, for example, if enough points (e.g., four or more) support the existence of a non-orthogonal wall.

Overview of Floorplan Generation Using Ranging and Orientation Data

1. Obtain distance for some or all possible host unit-to-host unit pairs using wireless ranging.
2. Determine orientation of host units using some combination of accelerometer, gyrometer (gyroscope), and compass. Some embodiments may employ any suitable IMU device, magnetometer, barometer (for determining an elevation of a host unit), or other orientation and/or position determining technology.
3. Create a point cloud using least squares error based Trilateration algorithm or other suitable method.
4. Sort hosts into groups based on their normal vector. Host units may have a fixed orientation relative to the wall they are installed in and the normal vector can be the vector normal to the wall and facing into the room in which the host is installed.
5. Use point cloud and normal vector to group host units by room.
   a. Generate list of coplanar host units.
   b. Create possible set of walls from the coplanar set, use normal vector to separate coplanar host units onto different sides of each wall.
   c. Opposite sides of a room can be defined by two possible walls that are parallel where the normal vector of host units on both walls are facing towards each other, and there is not another parallel wall bisecting the space in between.
6. Generate floor plan by combining possible walls with generated rooms.

Overview of Floorplan Generation Using Supplementary and/or Alternative Detection Resources Any of the techniques that follow can be combined with other sources of data to improve floorplan accuracy. Other non-limiting examples of sources of data can include: Roomba mapping, LIDAR, VR/AR base stations, user inputs, RADAR, acoustics (ultrasonics), light, and modular accessory ID. For acoustics, acoustic information can be used to determine possible room makeup, or instance, by generating sound and listening for the response. In such cases, the acoustic reflection/absorption/reverb profiles can provide information as to whether the floor is carpeted or hardwood, for instance. Light can be used to determine zones of effect, how rooms are connected, if windows are present (which could be used to more accurately predict/locate exterior walls), and the like, as further described above. By cycling individual lights on and off and monitoring light sensors on other host units, the area of effect for a particular light can be determined. By way of example, a hallway light may affect the luminance in the hallway by 100%, but may also affect the luminance of the living room by 40% (relative to the hallway) and a bedroom by 10%. This information can also be used to identify if rooms are connected by doors or openings. If a light that has a known effect in another room, but does not affect the other room all the time, it may be determined and incorporated into the floorplan that there is a doorway between them, as described in a similar scenario addressed above. In addition, if the light sources that affect a room are turned off and there is still light detected, it may be determined that there is a window in that room. By looking at the relative brightness measurements of each sensor, you can then determine which wall the window is located. Furthermore, some aspects may be repurposed or have multiple uses. The UWB sensors (or LIDAR, ultrasonics, etc.), for example, may be used to not only generate a floor plan, but may also operate as a presence detect system. If a distance measurement (communication) between two host units is interrupted by a user walking through a room, and then communication between another set of host units in the room is interrupted, then not only can a presence be detected, but also a trajectory and, in some cases, a predicted destination based on the user's determined travel vector, the time of day, the user's calendar, a user's habits, etc. For instance, the user may have an appointment in 10 minutes and, based on the presence detection described above, it may be determined that the user is heading to the garage. In such a scenario, the overall system may turn on lights along the way to the garage, open the garage, communicate with and start the user's vehicle, or other useful prognosticative action. There are myriad possibilities and one of ordinary skill in the art with the benefit of this disclosure would understand the many variations, modifications, and alternative embodiments thereof.

In further embodiments, the Module ID of reported devices installed in a room can be used to determine the use of the room. For instance, a refrigerator is likely to be located in the kitchen, the humidity sensor is likely to be located in the bathroom or by the air conditioner, a baby monitor is likely to be located in a nursery or in the master bedroom. One of ordinary skill in the art with the benefit of this disclosure would understand the many variations, modifications, and alternative embodiments thereof.

Figure 10:
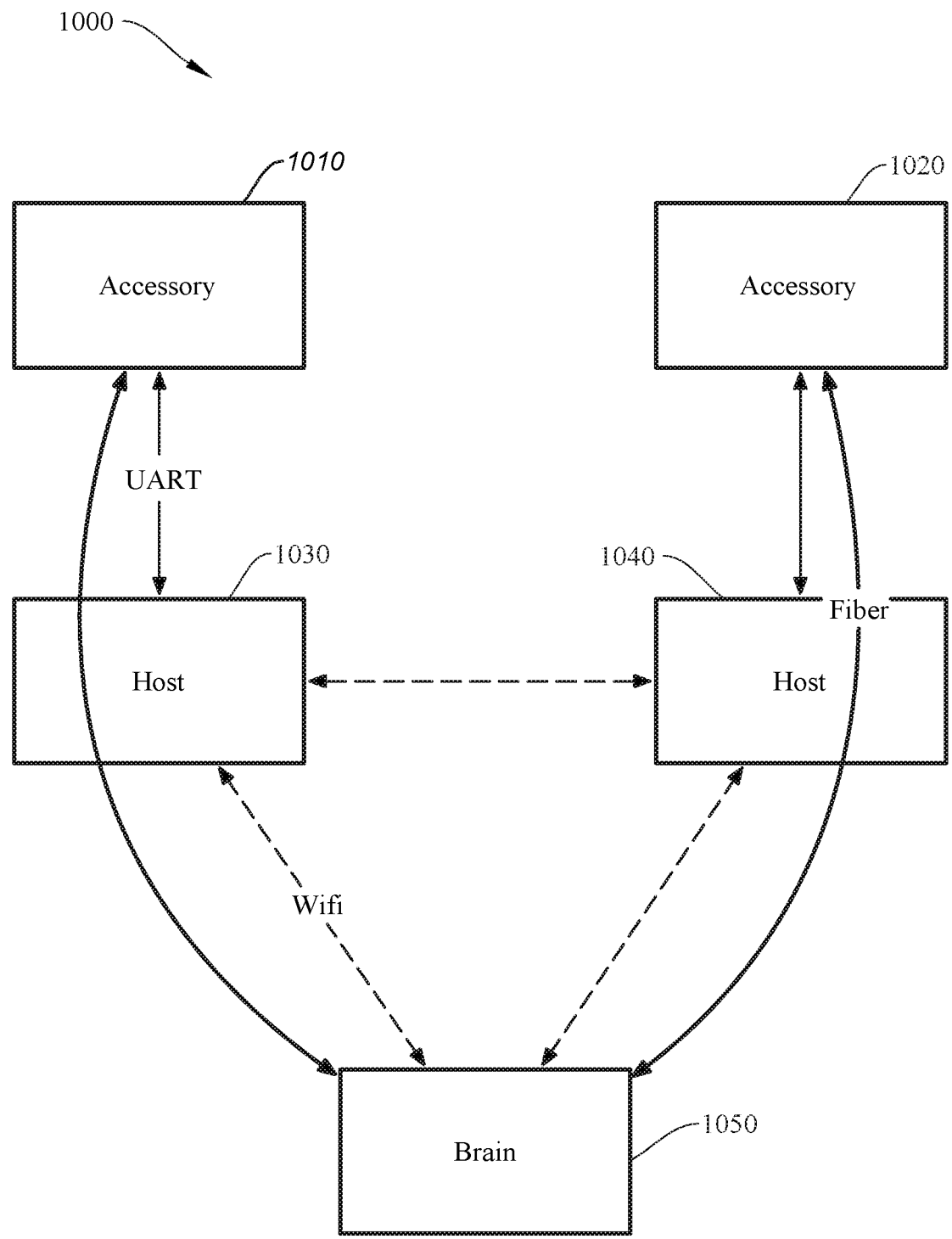
FIG. 10 shows a typical configuration of a plurality of a modular accessories, host units, and a brain, according to certain embodiments.

FIG. 10 shows a typical configuration of a plurality of a modular accessories, host units, and a brain, according to certain embodiments. Each modular accessory 1010, 1020 can be coupled to a corresponding host units 1030, 1040 via a DC UART connection for auto bootstrapping procedures (e.g., see FIG. 6), AC power, and data transmission lines (e.g., fiber optic lines) that may extend to the brain 1050. Host units 1030, 1040 may be in communication with one another (e.g., for ranging) and in wireless communication (e.g., Wi-Fi, Bluetooth, BLE, ZigBee, Z-Wave, IR, RF, etc.) with brain 1050.

Figures 11A, 11B, 11C:
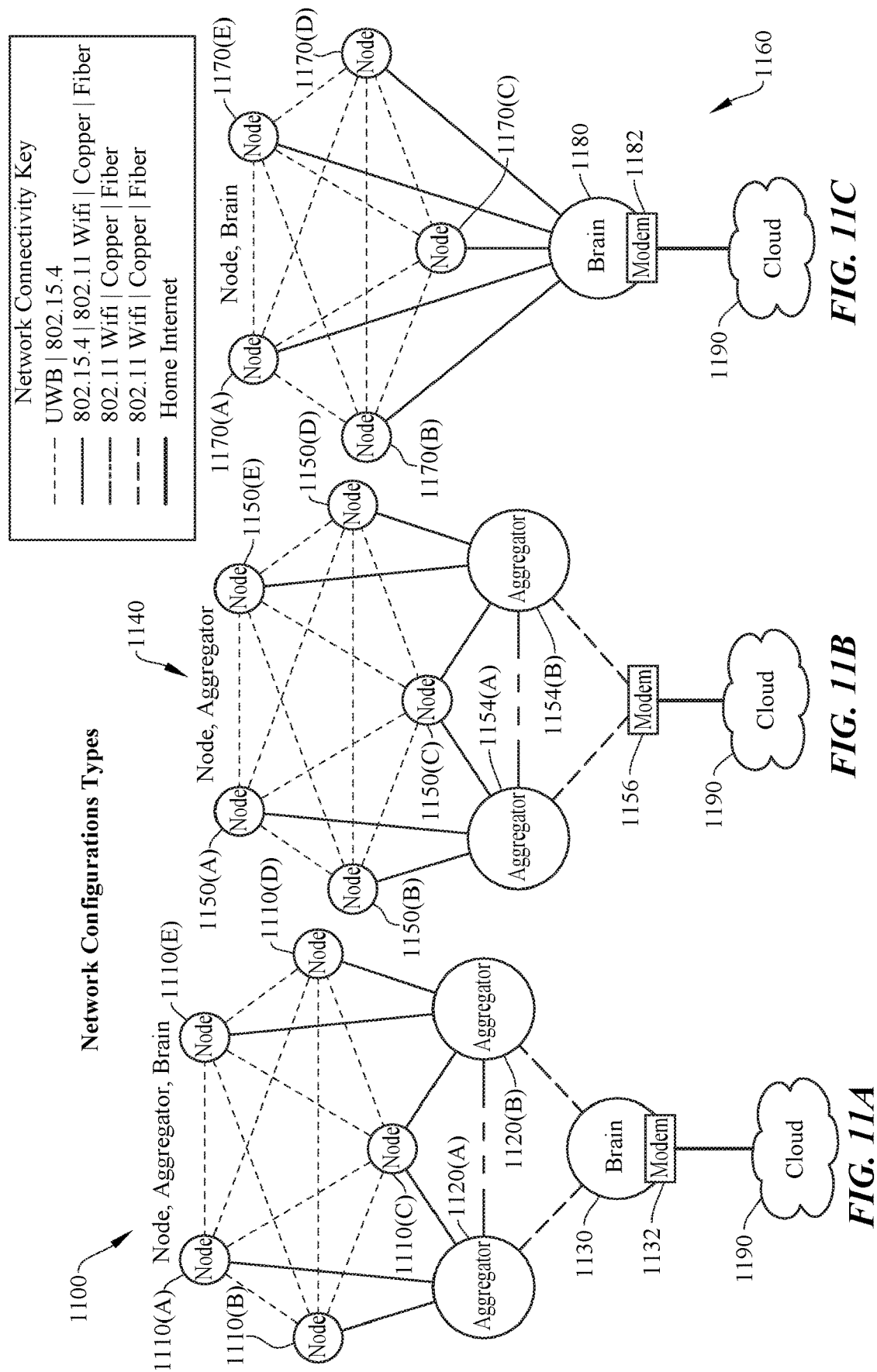
FIGS. 11A-11C show a number of possible node, aggregator, brain network configurations, according to certain embodiments.
Figure 12:
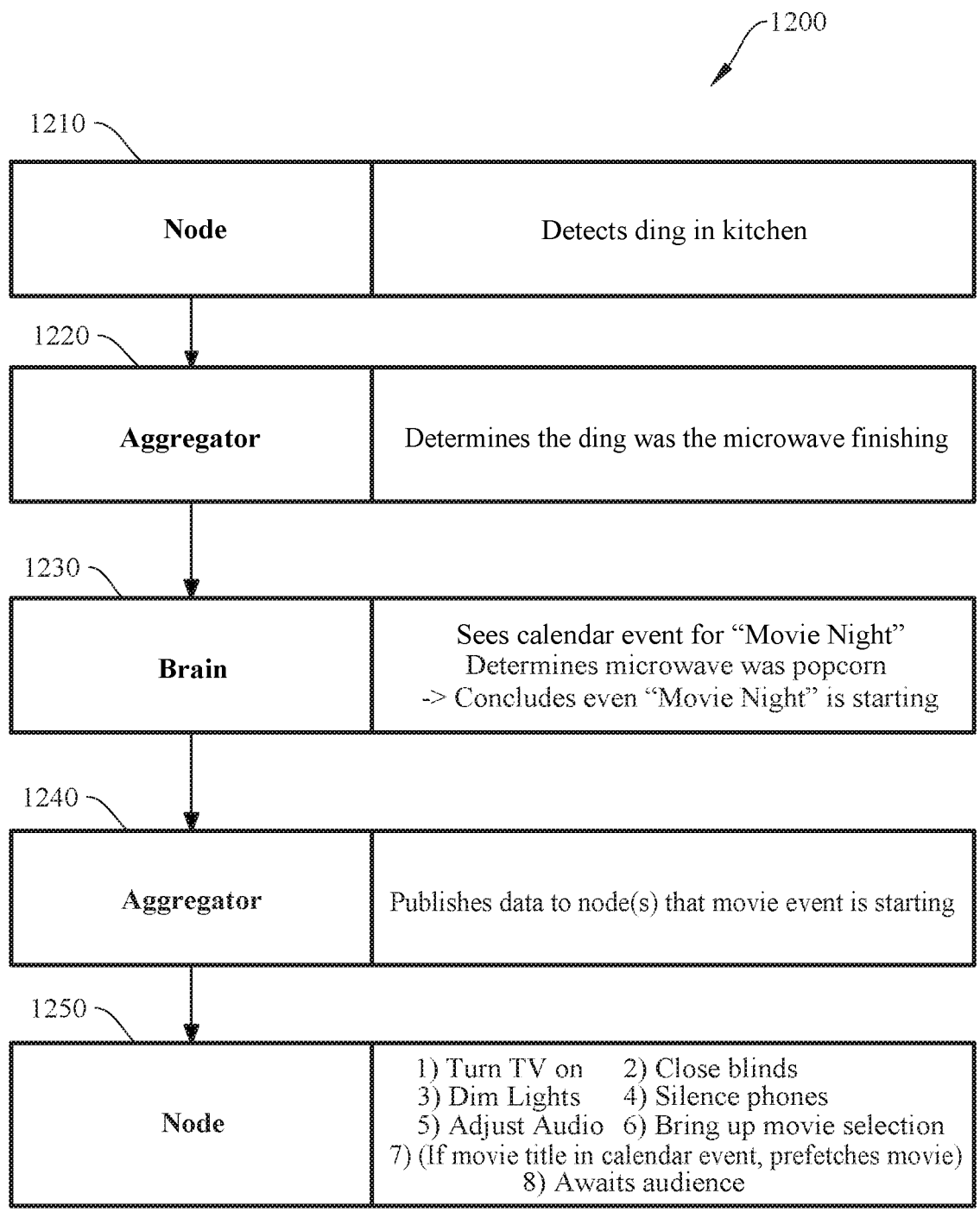
FIG. 12 shows a simplified flow chart of a typical node, aggregator, brain interaction, according to certain embodiments.

FIGS. 11A-11C show a number of possible node, aggregator, brain network configurations, according to certain embodiments. A node may refer to an end point that generates $1^{st}$ order data (e.g., raw sensor readings, event detection) or takes an action. For instance, a node can be a host unit/modular accessory pair. An aggregator can collect $1^{st}$ order data from nodes, generate $2^{nd}$ order data, (e.g., event classification, event grouping and summary) and can distribute $1^{st}$ and $2^{nd}$ order data. A brain can be configured to collect $1^{st}$ and $2^{nd}$ order data, generate $3^{rd}$ order data (e.g., event categorization and identification, and context aware event grouping and summary) and issue directives to node(s) and aggregator(s), such as take an action, update a logic table, update a network configuration, or the like. The logic table may store what actions the modular accessory can take and what inputs are required to make those decisions. The table can be generated by the brain and pushed to the modular accessory, with updates occurring the same way. Referring back to the figures, FIG. 11A shows a network configuration including a node, aggregator, and brain topology, FIG. 11B shows a network configuration including a node and aggregator topology, and FIG. 11C shows a network configuration including a node and brain topology. In some embodiments, a brain can be implemented on a general purpose computing device such as a desktop computer, laptop computer, tablet computer, smart phone, smart wearable, other handheld or wearable computing device, or the like, by providing the general purpose computing device with appropriate executable program code; alternatively, a controller can be a special purpose computing device. By way of example, FIG. 12 shows a simplified flow chart of a typical node, aggregator, brain interaction, according to certain embodiments.

Figure 13:
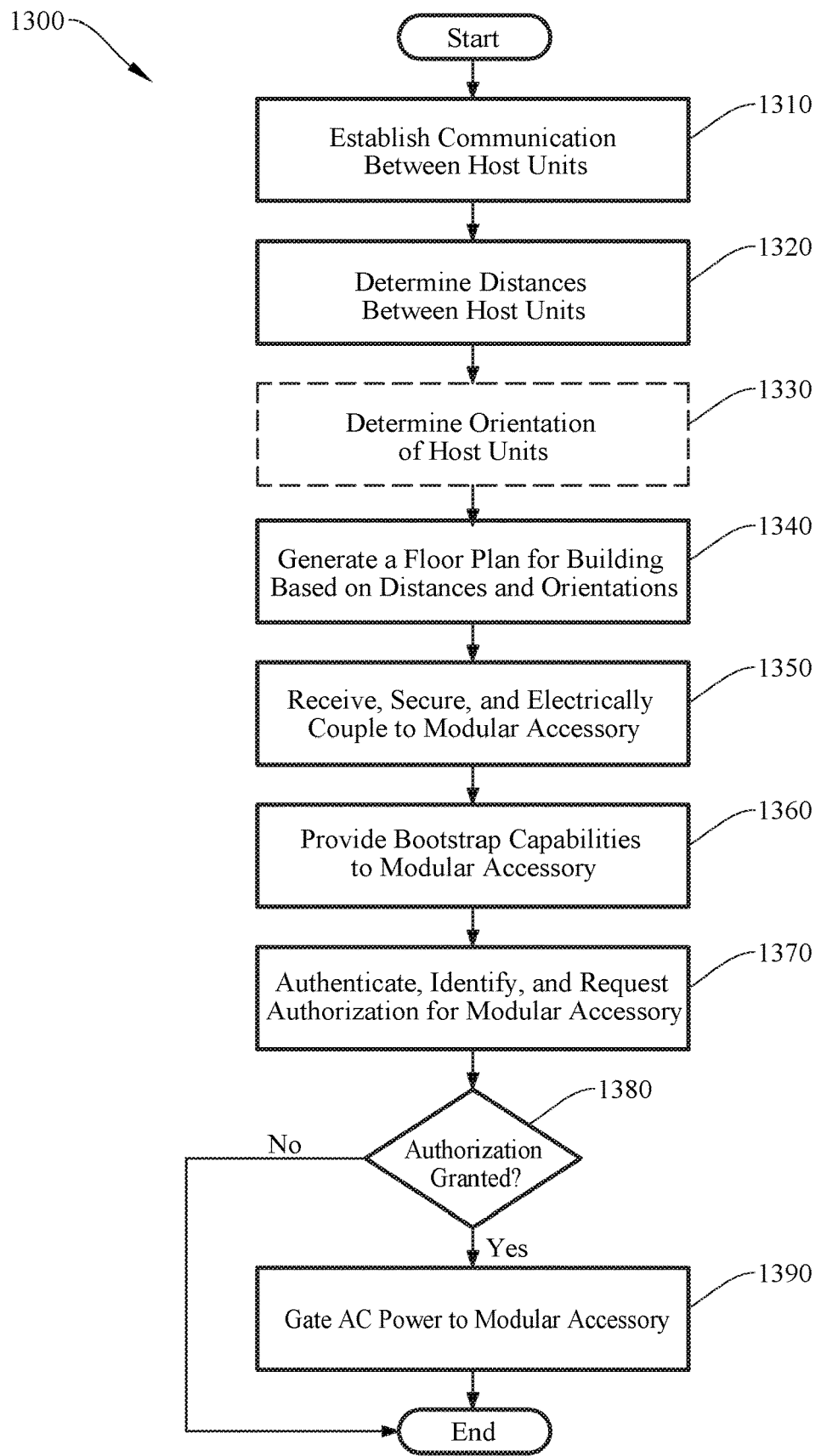
FIG. 13 shows a simplified flow chart for automatically generating a floorplan and provisioning a modular accessory, according to certain embodiments.

FIG. 13 shows a simplified flow chart for automatically generating a floorplan and provisioning a modular accessory, according to certain embodiments. Method 1300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1300 can be performed by a brain or equivalent, host unit, modular accessory, or any combination thereof.

At block 1310, method 1300 can include establishing an electronic communication between a host unit and one or more additional host units in the building, wherein the host unit is embedded within a support structure of a building.

At block 1320, method 1300 can include determining a distance from the host unit to the one or more additional host units based on the electronic communication between the host unit and the one or more additional host units. In some cases, determining the distance may be performed using one of ultra-wide band (UWB) communication, radar, ultrasonics, or IEEE 802 communication protocols.

At block 1330, method 1300 can include receiving orientation data from the host unit and the one or more additional host units and determining a physical orientation of the host unit and the one or more additional host units based on the orientation data. In such cases, generating a floor plan for the building may be further based on the determined physical orientations of the host unit and the determined physical orientations one or more additional host units. Each of the host unit and the one or more additional host units may include a magnetometer operating as a compass and an accelerometer configured to detect an orientation of the host unit relative to a direction provided by the magnetometer, where the orientation data may include the data received from the magnetometer and the accelerometer. Alternatively or additionally, a phased antenna array can be used to determine angle of arrival of communication data between host units, as discussed above with respect to FIG. 4.

At block 1340, method 1300 can include generating a floor plan for the building based on the determined distance(s) from the host unit to the one or more additional host units.

At block 1350, method 1300 can include receiving and housing, by the host unit, a modular accessory, where the host unit can be coupled to an electrical source and couples electrical power from the electrical source to the modular accessory in response to the modular accessory being received and housed by the host unit.

At block 1360, method 1300 can include providing bootstrap capabilities to a coupled modular accessory. As described above, a DC UART connection may provide DC power and limited resources to allow a modular accessory to authenticate and identify itself (1370). In some cases, once authenticated, the installation of the modular accessory may need to be authorized (e.g., approved by a user).

At block 1380, in response to the authorization of the modular accessory, method 1300 can include gating the electrical power (e.g., AC and/or DC power) from the electrical source to the modular accessory by coupling the electrical power from the electrical source to the modular accessory in response to determining that the modular accessory is communicatively coupled to the host unit, and decoupling the electrical power from the electrical source to the modular accessory in response to determining that the modular accessory is communicatively decoupled to the host unit.

It should be appreciated that the specific steps illustrated in FIG. 13 provide a particular method 1300 for or automatically generating a floorplan and provisioning a modular accessory, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof. Further, it should be noted that any of the methods described throughout this disclosure may be performed, for example, by a system having one or more non-transitory, computer readable storage mediums containing instructions configured to cause the one or more processors to perform operations of the method; or by a non-transitory computer-program product tangibly embodied in a machine-readable non-transitory storage medium including instructions to cause a processor to perform the operations of the method; either of which being embodied, for instance, by aspects of the system of FIGS. 4, 6, 10-12, and 14. In some of the embodiments, one or more processors may perform the operations of method 1300, which can include processor(s) on the host unit, processors on a remote entity (e.g., a brain, laptop, smart device, etc.), processors on multiple host units, or any combination thereof, as would be appreciated by one of ordinary skill in the art with the benefit of this disclosure.

In some embodiments, a mobile electronic device (e.g., smart phone, remote control, smart wearable device, laptop, etc.) may be detected and the system may determine that the mobile electronic device is pointing at the host unit and control may be offloaded in whole or in part to the mobile electronic device to allow, for example, a smart phone to control certain functionality of the system (e.g., turn off the lights) by simply pointing at a particular modular accessory/host unit. Once it has been determined that a mobile electronic device has selected a host unit, it can control it either with via conventional means (e.g., buttons, menus) or by using the orientation data on the mobile electronic device to sense gestures to initiate control schemes.

Object Detection Using a Mesh of Host Units as "Virtual Tripwires"

In some embodiments, a modular multi-host system may be configured to detect the presence of an object by measuring changes in distance measurements between host units. When an object obstructs a particular line-of-sight measurement between host units, the communication signal (e.g., UWB, ultrasonics, etc.) may pass through the object, which can change the TOF measurement. For instance, if a distance between two host units is measured to be 2.5 m via TOF calculations and a sofa is subsequently placed between the two host units, obstructing the line-of-sight between them, the measured distance may change as the UWB signals may pass through the sofa at a slightly slower rate than in open air. Changes may be on the order of millimeter, centimeters, or more, depending on the type of obstruction. As described above, the line-of-sight (LOS) communications between host units may be thought of as operating like virtual "trip wires" that "trigger" when an objects passes between them and changes their corresponding line-of-sight TOF measurement. In some cases, the computations to determine the distances between host units may be performed at the host unit(s), by installed modular accessories, by aggregators, by a system brain, or a combination thereof, as described above.

Alternatively or additionally, some embodiments may use phased antenna arrays in the host units to communicate with other host units in the system. In such systems, an angle-of-signal arrival for the phased antenna arrays can be measured. Objects passing through the line-of-site of the communication may distort or change the angle-of-signal arrival. Such changes may be used (e.g., threshold changes) to determine a presence of an object, as described above with respect to TOF distance measurements, as would be appreciated by one of ordinary skill in the art with the benefit of this disclosure.

In addition to a change in a measured distance, an amount of distortion in the measured signal, which can manifest as an amount of variation in a measured distance, can be used to determine a type of detected object. As briefly described above, some uniform and inert materials may cause a change in the TOF measurement (and consequently the measured distance) that is relatively constant, while other non-uniform materials (e.g., a human or pet) may be in constant change, resulting in a fluctuating TOF measurement, which may manifest as "noise" or distortion in the measured signal. The amount of distortion and the frequency content of the distortion in the TOF measurements can be used to help distinguish such objects. Alternatively or additionally, a phased antenna array in one or more host units may be used in a similar manner. That is, an amount of distortion and the frequency content of the distortion in the angle-of-signal arrival signals can be used to determine a type of detected object (e.g., animate vs. inanimate). In some embodiments, an average angle-of-signal arrival can be estimated and typically a delta of three sigma from the estimated average may trigger an event. In some cases, a change of 10 degrees or more may be a threshold to trigger object detection. Any delta or change in degrees (larger or smaller) can be used as a threshold trigger. In some implementations, multiple triggers can be used (e.g., with varying levels of confidence—the greater the delta/change, the greater confidence in object detection). One of ordinary skill in the art with the benefit of this disclosure would appreciate the many modifications, variations, and alternative embodiments thereof.

Host units configured for object detection may operate continuously or intermittently, synchronously (e.g., across multiple host units) or asynchronously, or other suitable configuration. For example, periodic measurements (e.g., every 10 ms, 100 ms, 1 s, 5 s, etc.) or aperiodic measurements are possible. In some cases, object detection (e.g., wireless communication between host units and TOF measurements) may be enabled when it is known that an occupant is in a building (e.g., via other sensor systems, communication with user mobile devices (e.g., smart phone or watch, or the like). The density of the object detection mesh may be based on user presence within the building. For instance, if there is no one in a particular room, object detection may only be enabled to cover the entrances of the room. When an object enters the room, the density can then be increased to give fine grained position within the room.

Figure 14:
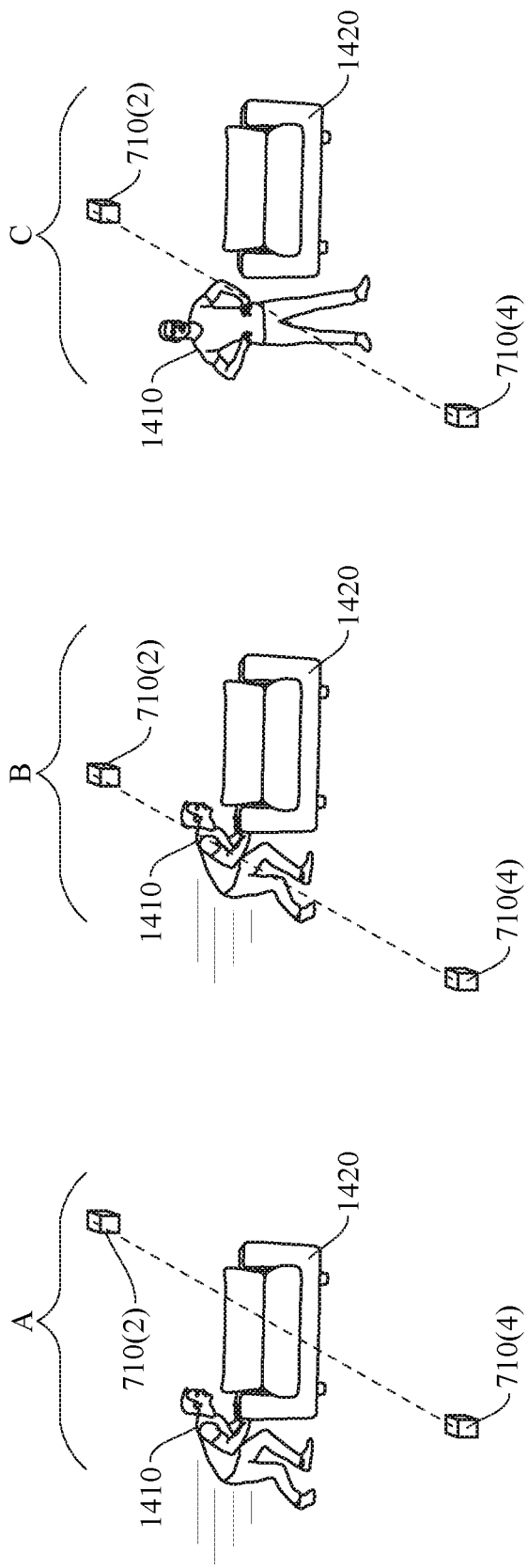
FIG. 14 shows aspects of object detection using a configurable home infrastructure, according to certain embodiments.

FIG. 14 shows aspects of object detection using a configurable home infrastructure, according to certain embodiments. In particular, three simplified scenarios are depicted and described to illustrate aspects of object detection and object type identification, as further described below. Note that any mesh of two or more host units can be used, however meshes with greater number of host units and virtual trip wires may tend to provide more data, greater resolution with respect to pinpointing an object's precise location, etc. For the purposes of explanation, the following embodiments will refer back to the host unit mesh of the configurable home infrastructure shown and described above with respect to FIG. 7.

Referring to FIG. 14, scenarios A-C depict a user 1410 pushing a couch 1420 along the floor and through a virtual tripwire formed by the LOC communication path between sensor 710(4) and sensor 710(2). In scenario A, couch 1420 is passing through the tripwire. In scenario B, user 1410 is passing through the tripwire. In scenario C, user 1410 finishes moving couch 1420 and stops to rest. Note that in scenarios A and B, couch 1420 and user 1410 are moving at the particular points in time that are shown. In contrast, the user is standing still with relatively no movement through the tripwire.

Figure 15:
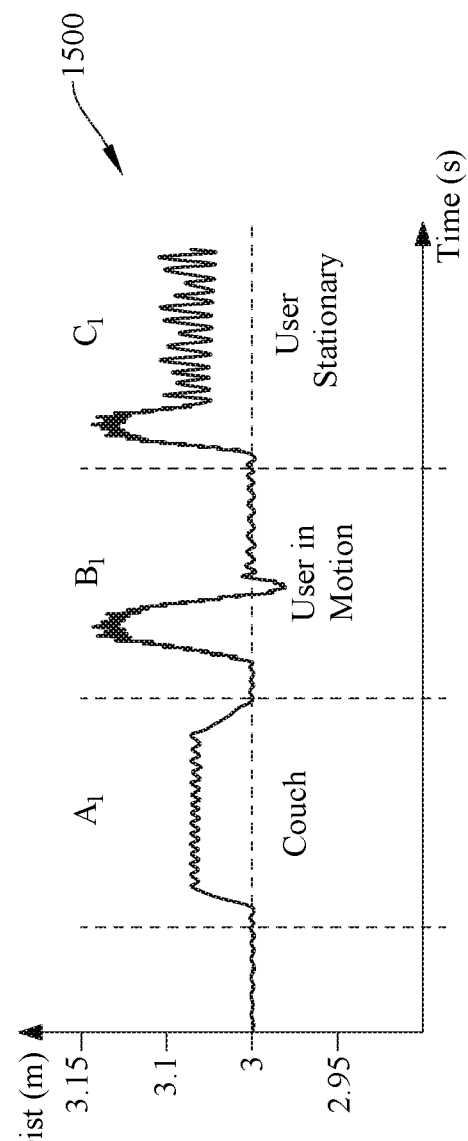
FIG. 15 is a simplified graph showing changes is distance measurements between host units as different objects are passed between them, according to certain embodiments.

FIG. 15 is a simplified graph 1500 showing changes is distance measurements between host units as different objects are passed between them, according to certain embodiments. Graph 1500 shows a measured distance between sensors 710(4) and 710(2) for scenarios A-C depicted in FIG. 15. In scenario A, as couch 1420 begins passing through the tripwire, the TOF between sensors 710(4-2) the wireless communication signal may take more time to pass through the materials forming couch 1420, as compared to an unimpeded, open air transmission. Alternatively or additionally, the TOF may take an alternate path between the transmitting host unit and receiving host unit by way of reflections of the walls, ceiling, or other objects. In such cases, the system can measure any particular TOF (e.g., the first reflection) as a reference measurement. In any of these cases, the measured distance between sensors 710(4-2) may appear to be increased. Referring to graph 1500, section A, as couch 1420 begins traversing the tripwire, the TOF measurement increases, causing an increase in the distance measurement between host units from about 3 m to approximately 3.08 m. Note that the distance measurement prior to couch 1420 passing through the trip wire is relatively constant with a small amount distortion (e.g., variation) in the calculated distance. In scenario A, as couch 1420 passes through the tripwire, the increased distance measurement includes a small increase in distortion. As chair 1420 completely passes through the tripwire, the calculated distance between sensors 710(4-2) returns to 3 m with comparatively little distortion. As described above, couch 1420 may be comprised of uniform and/or inert materials, which can result in small amounts of distortion as compared to non-uniform and/or continuously changing objects, such as a person or animal. As described above, and as applied throughout the disclosure, both the magnitude (amount) and frequency content of the distortion changes may be used.

In scenario B, couch 1420 completely passes the tripwire and user 1410 begins passing through. Referring to graph 1500 section B, a large increase in the calculated distance between sensors 710(4-2) is shown as the material properties of user 1410 cause a greater change in the TOF measurement and greater distortion. As described above, user 1410 is comprised of organs, bones, flowing liquids, etc., with each having a different density and effect on the TOF measurement, hence the simplified representation of the changing measured distance over time showing how different portions of the body may affect the distance calculation. After user 1410 passes through, the calculated distance measurement between sensors 710(4-2) returns to about 3 m with minimal distortion.

In scenario C, user 1410 stops moving and remains stationary. After the initial change is calculated distance (similar to scenario B), the calculated distance is shown with significantly more distortion as compared to couch 1420. When user 1410 remains stationary, the peak may (hump) settle to an average value with significant distortion as compared to couch 1420 for the reasons described above. Note that the representation of the time scale and how changes in a calculated distance between sensors 710(4-2) is simplified for the purposes of explaining the concepts herein. It would be understood by one or ordinary skill in the art with the benefit of this disclosure that these signals may vary considerably, however the underlying concepts regarding changes of distances measurements and corresponding distortions still apply. Further, one of ordinary skill in the art with the benefit of this disclosure would understand that phased antenna arrays and angle-of-signal arrival (also referred to as "angle-of-arrival" or "AoA") can be used instead of or in addition to TOF to detect a presence of an object (e.g., based on a threshold change), detect an amount of signal distortion or frequency shift in the AoA, or the like, as described above with respect to distance and TOF measurements.

Figure 16:
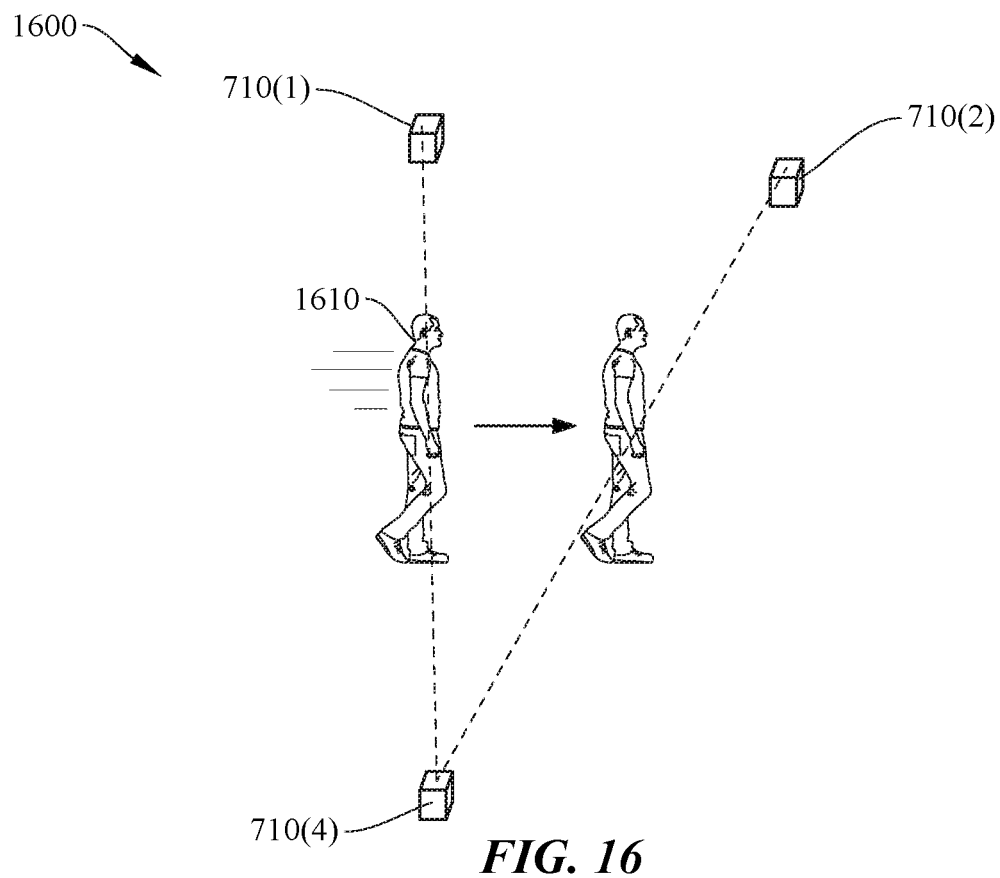
FIG. 16 shows aspects of determining a vector for a detected object, according to certain embodiments.
Figure 17:
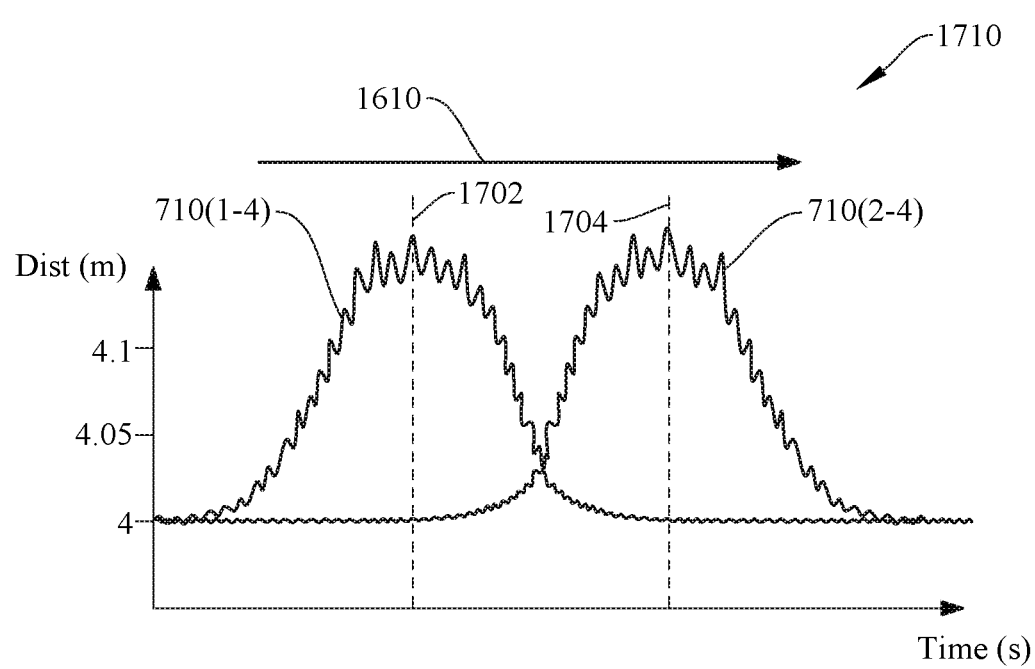
FIG. 17 is a simplified graph showing aspects of determining a vector for a detected object, according to certain embodiments.

FIG. 16 shows aspects of determining a vector for a detected object, according to certain embodiments. Referring to scene 1600, a user 1610 is moving across a room and traversing two virtual tripwires formed by host unit pairs 710(4-1) and 710 (4-2). The traversal across each tripwire generated by each host unit pair may cause the TOF and corresponding distance calculation to change and distort, as described above and as shown in FIG. 17. For instance, as user 1610 passes through host unit pair 710(4-1), a determined distance appears to increase (see Gaussian curve 710(1-4)), peak at 1702, and drop off thereafter as user 1610 moves past the tripwire. Similarly, as user 1610 passes through host unit pair 710(4-2), a determined distance appears to increase (see Gaussian curve 710(2-4)), peak at 1704, and drop off thereafter as user 1610 moves past the tripwire. The traversal over multiple tripwires necessarily occurs in a chronological fashion. As such, a user's travel vector can be determined based on the chronological order that the user passes the tripwires. In a simplified example, if a user passes two parallel tripwires at an angle normal to the tripwires, the user's vector can be calculated based on the distance between the two parallel tripwires in a direction normal to said tripwires. Typically, a denser mesh of tripwires can facilitate greater resolution and accuracy with location tracking and vector calculations. It should be noted that the distance measurement waveforms show one representation, however many other are possible, For example, some systems may have discontinuous measurements (e.g., measured every 100 ms), some communication mediums may be more or less impeded by objects, resulting in different TOF measurements and/or distance calculations. Although a simplified number of host pairs using a common host unit 410(4) is shown in FIGS. 16-17, vector measurements can be made between different sets tripwires that may not have a common host unit. One of ordinary skill in the art with the benefit of this disclosure would understand the many variations, modifications, and alternative embodiments thereof. Note that the use of the term "vector" used with respect to a detected object can mean a determined direction and rate of the object. This is not to be confused with the "normal vector" described above in FIG. 4 with respect to gravity for determining host unit orientation.

In some embodiments, a vector may be determined based on a trigger of a single virtual tripwire. For example, if a user is known to be present in a room and/or the object's dimensions are known, then an analysis of the transient response of the single Gaussian waveform can provide distance data, speed data, or both. In some cases, a single tripwire may partially rely on the angle of arrival (AoA) changing rather than just the ToF. For instance, consider a single tripwire with one node at the origin and the other some distance away. From the perspective of the origin node, as a user walks through the trip wire from left to right, the AoA from the far node may preferentially shift right (i.e., the far node appears to have moved to the right from where it was originally), then become occluded (dominant reflection path), then come back with a left shift (appear to the left of its original position) and finally return to normal. From the perspective of the far node, the user would appear to walk through the wire right to left, so the AoA shift may be reversed: shift left, occluded, shift right, normal. In the case of multiple tripwires, a simple example is between three nodes, one at the origin, a far left node and a far right node. If origin-left trips then origin-right trips, then the occluding object was passing on a trajectory from left to right from the perspective of the origin node. If origin-right trips then origin-left trips, then the occluding object was passing on a trajectory from right to left from the perspective of the origin node. In both of these methods, the rate of change or time-proximity of sequential occlusion can provide information as to the size and/or velocity of the object that is occluding the tripwires. Furthermore, the orientation of a user within the tripwire affects the distortion that is added to the measured distance. In addition, the width of the Gaussian can be used to detect how long a user is within the tripwire. These two aspects combined can be used to approximate the angle at which the user is moving relative to the tripwire. It should be noted that although the many examples provided herein present two or more host units of a modular home infrastructure as the primary implementation of generating virtual trip wires, it would be understood by one of ordinary skill in the art that the various ToF, AoA, distortion-based analysis, etc., could be implemented on other devices as well, including any set of devices with communications technology such as UWB, radar, ultrasound, RF, etc., as described above. For example, Apple HomePod® devices may be configured to generate virtual tripwires, as would be appreciated by one of ordinary skill in the art with the benefit of this disclosure.

Figure 18:
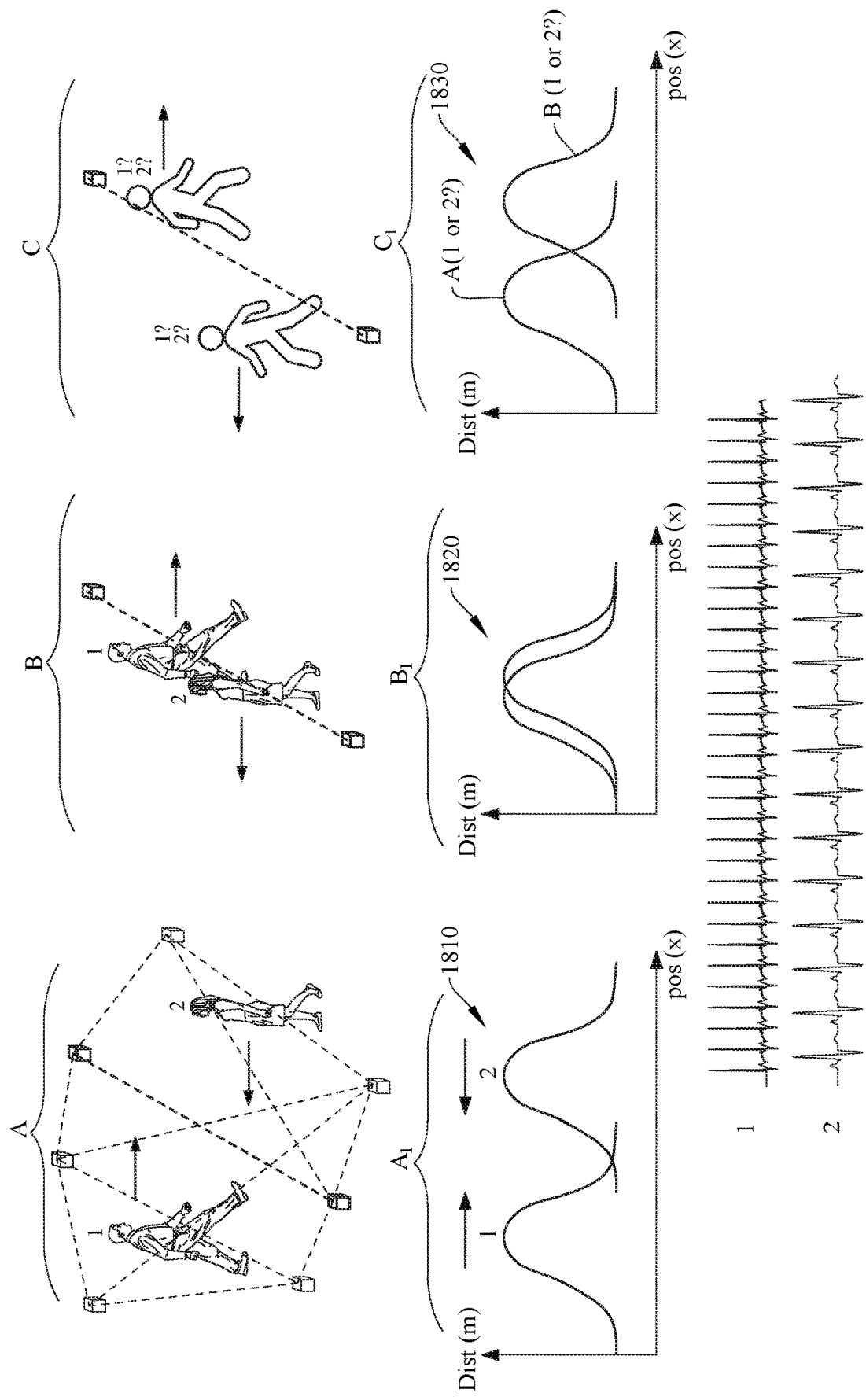
FIG. 18 shows aspects of differentiating between multiple detected objects in a configurable home infrastructure, according to certain embodiments.

FIG. 18 shows aspects of differentiating between multiple detected objects in a configurable home infrastructure, according to certain embodiments. In scenario A, user 1 and user 2 are walking in opposite directions toward each other in a mesh of virtual tripwires. For this example, it is assumed that the mesh of virtual tripwires is dense enough such that users 1 and 2 can be continuously tracked within the scene, as represented by the moving Gaussian curves of graph 1810 (denoted as $A_1$) that track a change as a determined distance between host units and, for the purposes of explanation, a position of the tracked object in the scene. In scenario B, user 1 and user 2 are crossing paths, which is represented in graph 1820 (denoted as $B_1$). In scenario C, it is unclear (from a system detection perspective) whether user 1 and user 2 have crossed paths and are continuing on their previous trajectory, or if they stopped and changed directions crossing paths, as represented in graph 1830 (denoted as $C_1$). It should be noted that this example is simplified to illustrate alternative ways to differentiate one detected object from another when their corresponding signals (e.g., based on TOF measurements) are momentarily ambiguous, as shown in graphs 1820 and 1830.

In some embodiments, a mesh of virtual tripwires in a particular area may provide three-dimensions of resolution (trigger points) when enough interconnected host units are located in a particular area, as shown in a simplified manner in scenario A. In such arrangements, users 1 and 2 can be differentiated from one another based on their physical attributes. For instance, a dense mesh of virtual trip wires may provide enough resolution to determine an object's relative size and movement characteristics. Some trip wires may be configured higher or lower than others, some may be directed at different angles relative to one another, etc., which can provide enough data points to determine an object's relative size and movement characteristics. For example, users 1 and 2 may be distinguished at scenario C if their heights are sufficiently different (e.g., five feet versus six feet tall) and enough tripwire resolution is available to recognize the different. In one instance, a trip wire may be configured at around six feet, such that user 1 traverses it, but user 2 does not. In another example, an object's vector can be used to differentiate from another object if their corresponding speeds/directions are sufficiently different and determinable. In some cases, a person's gate (characteristics of their walking pattern) may be detectable in certain meshes, which can be used to help differentiate between multiple users.

In some cases, biometrics can be used to differentiate users. Biometrics such as fingerprints, iris scans, etc., generally require a person to physically provide this information for a sufficient level of authenticity (versus a wirelessly sent digital representation of a biometric). A person's heart beat pattern may provide uniquely identifying traits of the person and can be measured remotely. Although a heart rate may change, certain characteristics of the heart beat pattern can remain regardless of the heart rate. For instance, a 60 GHz millimeter wave sensor (MWS) system (or MWS system operating at another frequency) may be used to scan a person's heart rate. In some cases, respiration rate can also be measured with this technique, and can be used to help differentiate users. Referring back to FIG. 18, user 1 can be differentiated form user 2 when tracking their heart rates (shown in the figure). The users may be differentiated based on the rate of the heartbeat and/or the pattern of the heartbeat, as described above. In some embodiments, a 60 GHz millimeter wave scanner (or other suitable heart rate scanning technology) may be incorporated as a modular accessory in one or more of the host units in a given mesh.

Figure 19:
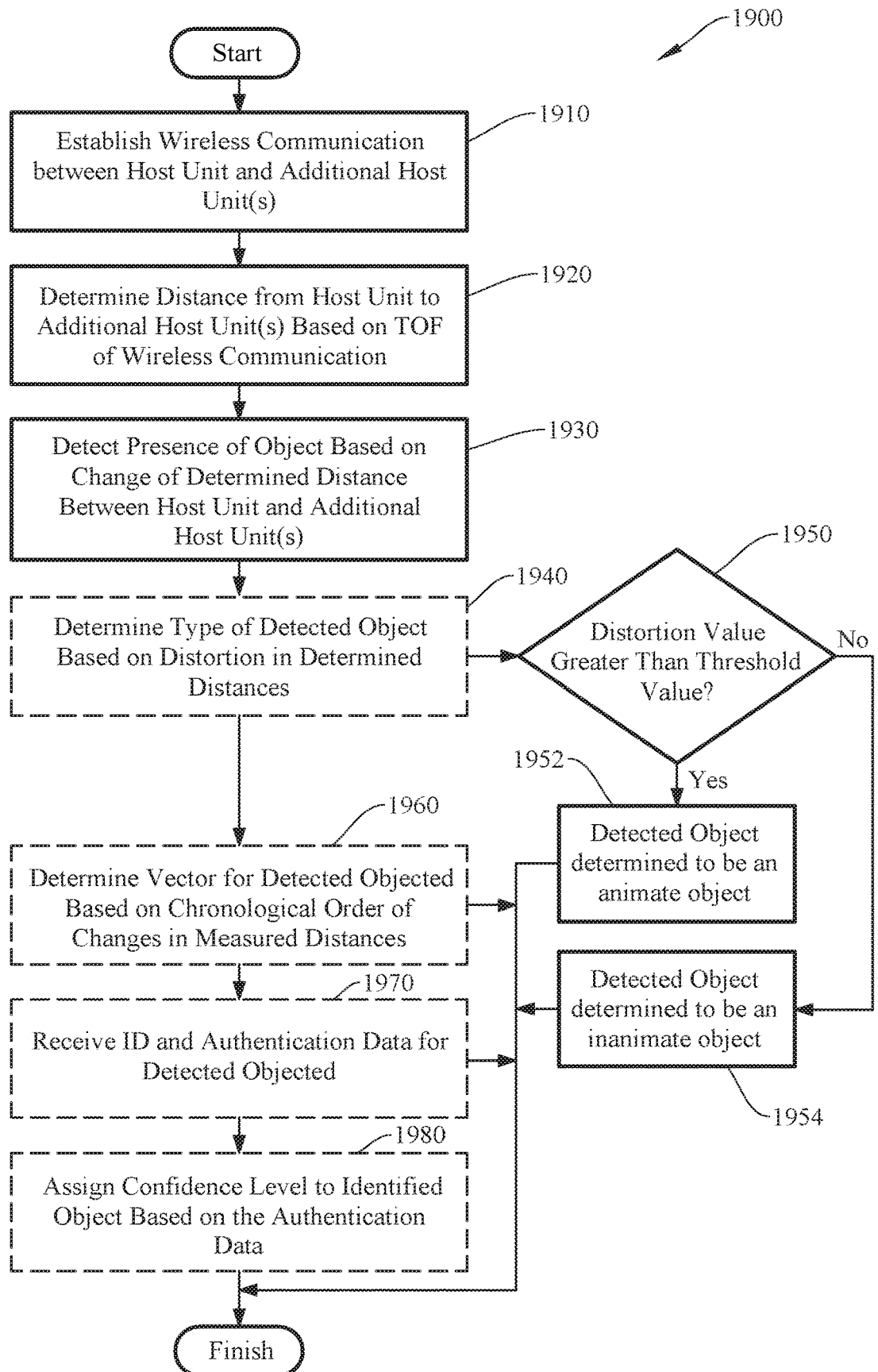
FIG. 19 is a simplified flow chart showing aspects of object detection, vector detection, and user authentication in a configurable home infrastructure, according to certain embodiments.

FIG. 19 is a simplified flow chart 1900 showing aspects of object detection, vector detection, and user authentication in a configurable home infrastructure, according to certain embodiments. Method 1900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1300 can be performed by a brain or equivalent, host unit, modular accessory, or any combination thereof.

At step 1910, method 1900 can include establishing a wireless communication between a host unit and an additional host unit(s), according to certain embodiments. Any suitable wireless communication protocol can be used including, but not limited to, UWB, radar, ultrasound, RF, ZigBee®, Z-Wave®, IR, Bluetooth® and variants thereof, or the like).

At step 1920, method 1900 can include determining a distance from host unit to additional host unit(s) based on a TOF of the wireless communication signal. For example, the distance between host units can be derived from the time it takes (i.e., time of flight) for the communication signal (or data thereof) to be emitted from the first host device and detected by the second host device, as further described above at least with respect to FIGS. 7-13.

At step 1930, method 1900 can include detecting a presence of an object based on a change of a determined distance between a host unit and the additional host unit(s). An object that crosses the communication path (e.g., virtual tripwire) can cause a delay in the TOF, which can cause the calculated distance between host units to increase. The change in the TOF (or calculated distance, or both) can be used to identify a presence of an object between the host units. In some cases, a threshold value for the change may be used to determine when an object is present (e.g., threshold met) and when there may simply be some random interference or noise (e.g., threshold not met) but no object (e.g., caused by EMI, system glitch, etc.). As indicated above, AoA and variance of the measured ToF can be used, magnitude and frequency content of noise on the measure distance can be used, as well as other metrics, such as signal strength and phase angle differences between multiple antennas.

At optional step 1940, method 1900 can include determining a type of the detected object based on a distortion in the determined distance, according to certain embodiments. At 1950, when the amount of distortion is greater than a threshold value (e.g., immediate step change may typically be 15-25 cm, but then can settle into a long-term offset on the order of 5-10 cm), the detected objected may be determined to be an animate object, such as a human or animal (step 1952). As described above, a high amount of distortion may be indicative of a non-uniform, non-inert object, which can also include other objects, such as a filled water cooler or other dynamically changing object that can manifest as greater distortion levels. When the amount of distortion is less than a threshold value, the detected objected may be determined to be an inanimate object, such as a chair, TV, table, or other solid and/or inert material that does not substantially change its composition or configuration over time (step 1954).

At optional step 1960, method 1900 can include determining a vector for a detected object based on a chronological order of changes in calculated distances, according to certain embodiments. For instance, a first pair of host units may detect an object when a TOF measurement between them increases by a threshold amount (e.g., 10 ps-10 ns, although other ranges are possible). Alternatively or additionally, object detection may be based on changes to a calculated distance between the host units, which can be derived from the TOF measurement, as described above. A vector for the object can be deduced by analyzing the chronological order of the object detection between host unit pairs (e.g., the timing of the triggering of each tripwire), a distance between each trip wire, and a time it takes for the object to be detected at each subsequent set of host unit pairs, as described above with respect to FIGS. 16 and 17.

At optional step 1970, method 1900 can include receiving identification and authentication data for a detected object, according to certain embodiments. For instance, identification data can include biometric data (e.g., heart rate data, finger print data, iris data), physical data (e.g., size data, walking gate data, etc.), or other identifying information that can be used to identify the person. Authorization data can include passwords, cryptographic key, USB drive with said passwords/keys, or other form of authorization that indicates that the detected person has some level of authorization privileges, which may include access to certain areas, permission to interface with certain systems (e.g., security system, safe, etc.), or the like.

At step 1980, method 1900 can include assigning a confidence level to the identified object (person) based on the identification and/or authentication data. A confidence level can be a level of certainty that the detected person is who they purport to be, or who the identification and/or authentication data appears to indicate who the detected person is. In some cases, a hierarchy may be established, such that certain identification and/or authorization data may provide different types of permissions for the detected person. For instance, biometric data may establish a first confidence level for an identified person, while a cryptographic key may establish a second, higher confidence level for the identified person. Different confidence levels may be used to establish different levels of access for the identified person. For example, a detected person may have full access and all permissions granted provided that they can positively identify themselves (e.g., an owner of a home). If the detected person provides biometric data to the host unit system (e.g., such as the systems of FIGS. 11A-11C) by physically providing it (e.g., provide finger print) or wirelessly providing it (e.g., received from a smart phone or wearable, heart rate detection as described in FIG. 18, etc.), but fails to produce authentication data, then a first level of confidence may be attained, but not the second. A consequential example may be that the person may utilize all entertainment devices, appliances, and general security features in the home (e.g., locks, geo-fence settings, etc.), but may not have access to certain heightened security systems (e.g., safe, security video controls, saved files with secure data, etc.). Some embodiments may prioritize biometric data (or certain subsets thereof) over authentication data. One of ordinary skill in the art with the benefit of this disclosure would understand the many variations, modifications, and alternative embodiments thereof.

It should be appreciated that the specific steps illustrated in FIG. 19 provide a particular method 1900 for object detection, vector detection, and user authentication in a configurable home infrastructure, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 20:
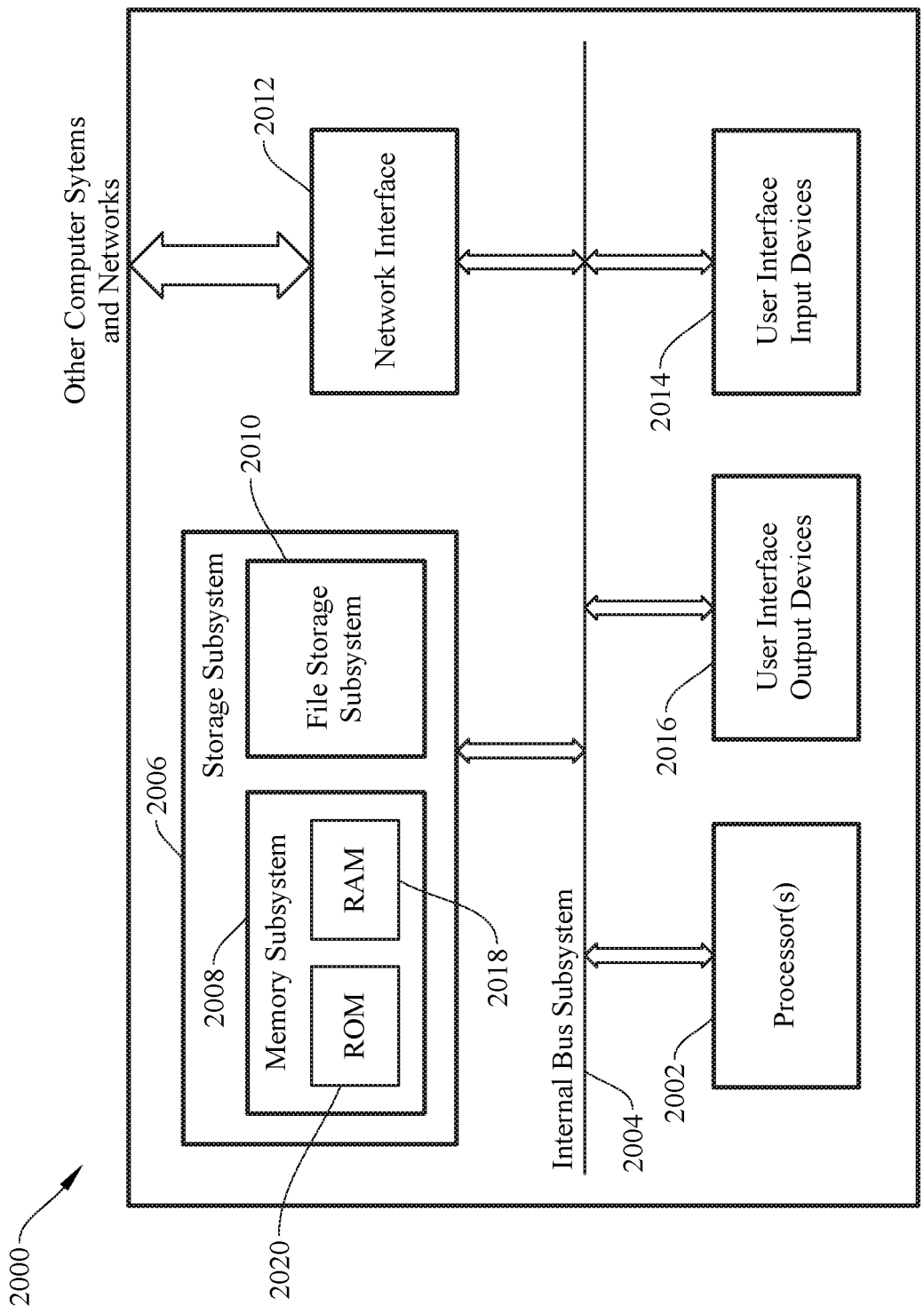
FIG. 20 shows a system for operating a controller device (brain) in a host unit-modular accessory network, according to certain embodiments.

FIG. 20 shows a system 2000 for operating a controller devices (brain) in a host unit-modular accessory network, according to certain embodiments. System 2000 can be used to implement any of the host controller devices discussed herein and the myriad embodiments defined herein or within the purview of this disclosure but not necessarily explicitly described. System 2000 can include one or more processors 2002 that can communicate with a number of peripheral devices (e.g., input devices) via a bus subsystem 2004. These peripheral devices can include storage subsystem 2006 (comprising memory subsystem 2008 and file storage subsystem 2010), user interface input devices 2014, user interface output devices 2016, and network interface subsystem 2012. User input devices 2014 can be any of the input device types described herein (e.g., keyboard, computer mouse, remote control, etc.). User output devices 2016 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 2004 can provide a mechanism for letting the various components and subsystems of computer system 2000 communicate with each other as intended. Although internal bus subsystem 2004 is shown schematically as a single bus, alternative embodiments of the bus subsystem can utilize multiple buses. Additionally, network interface subsystem 2012 can serve as an interface for communicating data between computer system 2000 and other computer systems or networks. Embodiments of network interface subsystem 2012 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 2014 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 2000. Additionally, user interface output devices 2016 can include a display subsystem, a printer, or non-visual displays such as audio output devices, etc. The display subsystem can be any known type of display device. In general, use of the term "output device" is intended to include all possible types of devices and mechanisms for outputting information from computer system 2000.

Storage subsystem 2006 can include memory subsystem 2008 and file storage subsystem 2010. Memory subsystems 2008 and file storage subsystem 2010 represent non-transitory computer-readable storage media that can store program code and/or data that provide the functionality of embodiments of the present disclosure. In some embodiments, memory subsystem 2008 can include a number of memories including main random access memory (RAM) 2018 for storage of instructions and data during program execution and read-only memory (ROM) 2020 in which fixed instructions may be stored. File storage subsystem 2010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 2000 is illustrative and not intended to limit embodiments of the present disclosure. Many other configurations having more or fewer components than system 2000 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The present document provides illustrations and descriptions, but is not intended to be exhaustive or to limit the scope of the invention to the precise form disclosed. Modifications and variations are possible in light of the above teachings or may be acquired from practice of various implementations of the present disclosure.

What is claimed is:

1. A system comprising:
   one or more processors; and
   a host unit installed in a support structure of a building, the host unit including:
   a communication module, controlled by the one or more processors, and configured to send or receive communication data with at least one or more additional host units installed in the building,
   wherein the one or more processors are configured to:
      measure an attribute of the sent or received communication data; and
      detect a presence of an object that at least partially obstructs a line-of-sight communication path between the host unit and at least one or more additional host units based on a temporary change in the measured attribute of the sent or received communication data between the host unit and the one or more additional host units,
   wherein the one or more processors are further configured to determine a type of the detected object based on:
      an amount of distortion or frequency content of the distortion in the communication data; and
      a relative uniformity of the distortion or frequency content of the distortion.

2. The system of claim 1, wherein the attribute is a time-of-flight (TOF) of the sent or received communication data, wherein the one or more processors are further configured to measure a distance between the host unit and each of the one or more additional host units based on the TOF of the sent or received communication data, and wherein a threshold change in the measured attribute is a threshold change in the measured distance.

3. The system of claim 2, wherein the one or more processors are configured to determine a vector for the detected object based on:
   a chronological order of the changes in the measured TOF between the host unit and at least two of the additional host units; and
   a distance between the at least two of the additional host units.

4. The system of claim 1, wherein the attribute is an angle of signal arrival of the communication between the host unit and each of the one or more additional host units, wherein a threshold change in the measured attribute is a threshold change in the measured angle of signal arrival.

5. The system of claim 4, wherein the one or more processors are configured to:
   receive data identifying the detected object including physical dimension data; and
   determine a vector for the detected object based on:
      a duration that the threshold change in the measured angle-of-signal arrival is detected; and
      the physical dimension data of the detected object.

6. The system of claim 1, wherein the type of the detected object is determined to be an inanimate object when the amount of distortion is below a threshold value, and
   wherein the type of the detected object is determined to be an animate object when the amount of distortion is at or above the threshold value.

7. The system of claim 1 further comprising a millimeter wave sensor (MWS) system controlled by the one or more processors, wherein the one or more processors are further configured to scan for a heart rate of the detected object using the MWS system in response to the presence of the object being detected, and wherein the one or more processors are configured to distinguish between two or more detected objects based on one or more characteristics of the scanned heart rates.

8. The system of claim 1, wherein the one or more processors are configured to receive identification data that identifies the detected object,
wherein the identification data includes user authentication data, and
wherein the one or more processors are configured to assign a confidence level to the identified object based on the authentication data, the confidence level corresponding to a level of confidence that the identified object is an accurately identified occupant.

9. A method comprising:
establishing a wireless electronic communication between a host unit and one or more additional host units in a building;
measuring an attribute of the wireless electronic communication;
detecting a presence of an object in the building based on a temporary change of the measured attribute of the electronic communication; and
determining a type of the detected object based on an amount of distortion in the wireless electronic communication and a relative uniformity of the distortion in the wireless electronic communication.

10. The method of claim 9 further comprising:
determining a distance from the host unit to the one or more additional host units based on a time-of-flight of the wireless electronic communication between the host unit and the one or more additional host units, wherein the detecting the presence of an object in the building is based on a threshold change of the determined distance.

11. The method of claim 10
wherein the type of the detected object is determined to be an inanimate object when the amount of distortion is below a threshold value, and
wherein the type of the detected object is determined to be an animate object when the amount of distortion is at or above the threshold value.

12. The method of claim 9 further comprising:
determining an angle-of-signal arrival of the wireless electronic communication, wherein the detecting the presence of an object in the building is based on a threshold change of the determined angle-of-signal arrival.

13. The method of claim 12 further comprising:
determining a type of the detected object based on an amount of distortion in the determined angle-of-signal arrival,
wherein the type of the detected object is determined to be an inanimate object when the amount of distortion is below a threshold value, and
wherein the type of the detected object is determined to be an animate object when the amount of distortion is at or above the threshold value.

14. The method of claim 9 further comprising:
determining a vector for the detected object based on a chronological order of the changes in the measured attribute of the electronic communication between the host unit and at least two of the additional host units.

15. A system comprising:
one or more processors; and
one or more non-transitory, computer readable storage mediums containing instructions configured to cause the one or more processors to perform operations including:
establishing a wireless electronic communication between a host unit and one or more additional host units in a building;
determining a distance from the host unit to the one or more additional host units based on a time-of-flight of the wireless electronic communication between the host unit and the one or more additional host units;
detecting a presence of an object in the building when the object at least partially obstructs line-of-sight communication path between the host unit and the one or more additional host units based on a temporary change of the time-of-flight measurement caused by the obstructing object; and
determining a type of the detected object based on an amount of distortion in the wireless electronic communication and a relative uniformity of the distortion in the wireless electronic communication.

16. The system of claim 15 wherein the instructions are further configured to cause the one or more processors to perform operations including:
determining a type of the detected object based on an amount of distortion in the determined distance between the host unit and the one or more additional host units.

17. The system of claim 16 wherein the type of the detected object is determined to be an inanimate object when the amount of distortion is below a threshold value, and
wherein the type of the detected object is determined to be an animate object when the amount of distortion is at or above the threshold value.

18. The system of claim 15 wherein the instructions are further configured to cause the one or more processors to perform operations including:
determining a vector for the detected object based on a chronological order of the changes in the determined distances between the host unit and at least two of the additional host units.

19. The system of claim 15 wherein the instructions are further configured to cause the one or more processors to perform operations including:
receiving identification data that identifies the detected object, wherein the identification data includes user authentication data; and
assigning a confidence level to the identified object based on the authentication data, the confidence level corresponding to a level of confidence that the identified object is an accurately identified occupant.

* * * * *